US010360378B2

(12) United States Patent
Watanabe et al.

(10) Patent No.: US 10,360,378 B2
(45) Date of Patent: Jul. 23, 2019

(54) ANALYSIS DEVICE, ANALYSIS METHOD AND COMPUTER-READABLE RECORDING MEDIUM

(71) Applicant: NEC Corporation, Tokyo (JP)

(72) Inventors: Masafumi Watanabe, Tokyo (JP); Yuki Ashino, Tokyo (JP)

(73) Assignee: NEC Corporation, Tokyo (JP)

( * ) Notice: Subject to any disclaimer, the term of this patent is extended or adjusted under 35 U.S.C. 154(b) by 164 days.

(21) Appl. No.: 15/505,498

(22) PCT Filed: Aug. 22, 2014

(86) PCT No.: PCT/JP2014/004320
§ 371 (c)(1),
(2) Date: Feb. 21, 2017

(87) PCT Pub. No.: WO2016/027292
PCT Pub. Date: Feb. 25, 2016

(65) Prior Publication Data
US 2017/0270297 A1    Sep. 21, 2017

(51) Int. Cl.
*G06F 21/56* (2013.01)
*G06F 21/55* (2013.01)
*H04L 29/06* (2006.01)

(52) U.S. Cl.
CPC ............ *G06F 21/56* (2013.01); *G06F 21/552* (2013.01); *G06F 21/566* (2013.01); *H04L 63/1408* (2013.01); *H04L 63/1416* (2013.01)

(58) Field of Classification Search
CPC ........ G06F 21/55; G06F 21/56; G06F 21/552; G06F 21/566; G06F 21/57; H04L 63/20; H04L 63/08; H04L 63/1408; H04L 63/14
See application file for complete search history.

(56) References Cited

U.S. PATENT DOCUMENTS 8,973,092 B2 *  3/2015  Kanoun .............. G06F 21/577
                                                        726/1
9,292,695 B1 *  3/2016  Bassett ............... G06F 21/577
(Continued)

FOREIGN PATENT DOCUMENTS

JP    H04-088430 A    3/1992
JP    2006-285599 A   10/2006
(Continued)

OTHER PUBLICATIONS

Japanese Office Action issued by the Japan Patent Office for Japanese Application No. 2016-543499 dated Dec. 12, 2017 (5 pages).
(Continued)

*Primary Examiner* — Khalil Naghdali
*Assistant Examiner* — Shaqueal D Wade
(74) *Attorney, Agent, or Firm* — Wilmer Cutler Pickering Hale and Dorr LLP

(57) ABSTRACT

Provided is an analysis device with which it is possible to find information relating to the intention and purpose of an attacker. The analysis device is provided with a purpose estimating means that estimates the purpose of behavior, based on predetermined behavior in the computer and knowledge information that includes the relation between the behavior and the purpose of executing the behavior.

16 Claims, 21 Drawing Sheets

(56) References Cited

U.S. PATENT DOCUMENTS

| | | | |
|---|---|---|---|
| 9,571,509 B1* | 2/2017 | Satish | G06F 21/566 |
| 2003/0070003 A1* | 4/2003 | Chong | G06F 21/577 |
| | | | 719/330 |
| 2010/0058474 A1 | 3/2010 | Hicks | |
| 2013/0111548 A1 | 5/2013 | Kanoun et al. | |

FOREIGN PATENT DOCUMENTS

| | | |
|---|---|---|
| JP | 2006-285983 A | 10/2006 |
| JP | 2010-267128 A | 11/2010 |
| JP | 2012-501504 A | 1/2012 |
| JP | 2013-525927 A | 6/2013 |
| JP | 2014-038596 A | 2/2014 |
| SG | 193808 A1 | 10/2013 |
| WO | WO-2010/025453 A1 | 3/2010 |

OTHER PUBLICATIONS

Decision to Grant a Patent issued by the Japan Patent Office for Japanese Application No. 2016-543499 dated Jul. 3, 2018 (4 pages).
Written Opinion corresponding to PCT/JP2014/004320 dated Apr. 7, 2015. (7 Pages).
International Search Report corresponding to PCT/JP2014/004320 dated Apr. 7, 2015. (5 Pages).
Kouki Yasumoto, Masakatsu Morii, and Koji Nakao, "Function Estimation of Malware Code by Measuring Similarity", IEICE Technical Report, Nov. 14, 2007, vol. 107, No. 343, pp. 31-36.

\* cited by examiner

Fig.4

(A)
```
L01: 2014/07/12 00:23:06 Action= "Wait" , Duration= "4948"
L02: 2014/07/12 01:45:34 Action= "DNSQuery" ,Name= "www.example001.com" , IPAddr= "10.17.20.10"
L03: 2014/07/12 01:45:56 Action= "HTTPRequest" ,DstIPAddr= "10.17.20.10" , StatusCode= "200" , ContentLength= "8489"
L04: 2014/07/12 01:52:01 Action= "DNSQuery" ,Name= "www.example002.com" , IPAddr= "10.17.20.20"
L05: 2014/07/12 01:52:02 Action= "HTTPRequest" ,DstIPAddr= "10.17.20.20" , StatusCode= "200" , ContentLength= "4125005"
L06: 2014/07/12 01:52:04 Action= "DNSQuery" ,Name= "www.example001.com" , IPAddr= "10.17.20.30"
L07: 2014/07/12 01:52:04 Action= "HTTPRequest" ,DstIPAddr= "10.17.20.30" , StatusCode= "404" , ContentLength= "545"
L08: 2014/07/12 01:52:05 Action= "Wait" , Duration= "3630"
L09: 2014/07/12 02:52:37 Action= "Scan" , DstPort= "3389"
L10: 2014/07/12 02:52:38 Action= "Wait" , Duration= "3600"
```

(B)
```
P01: Action="Wait", DurationMin="300", DurationMax="86400",Name="TIME WAIT"
P02: Action= "Wait" , DurationMin= "86400" , DurationMax= "2592000" ,Name= "SLEEP"
P03: Action= "Wait" , DurationMin= "2592000" , DurationMax= "99999999" ,Name= "LONG SLEEP"
P04: Action= "HTTPRequest" , StatusCode= "200" , ContentLength= "512000" , Name= "DOWNLOAD"
P05: Action= "HTTPRequest" , StatusCode= "404" , ContentLength= "512000" , Name= "SUSPICIOUS DOWNLOAD"
P06: Action= "Scan" , DstPort= "3389" , comment= "RDP PORT SCAN"
```

Fig.5
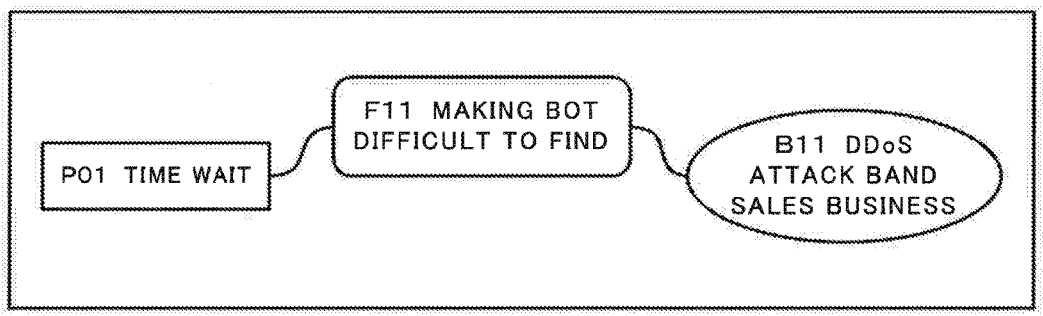
(A)
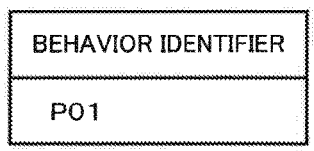
(B)
| FUNCTION IDENTIFIER | NAME |
|---|---|
| F11 | MAKING BOT DIFFICULT TO FIND |
(C)
| PURPOSE IDENTIFIER | NAME |
|---|---|
| B11 | DDoS ATTACK BAND SALES BUSINESS |
(D)
| RELATIONSHIP IDENTIFIER | LOWER IDENTIFIER | UPPER IDENTIFIER |
|---|---|---|
| R01 | P01 | F01 |
| R02 | F11 | B11 |
(E)

Fig.19

| ANALYST IDENTIFIER | RANK |
|---|---|
| A11 | 1.0 |
| A22 | 5.0 |
| A33 | 2.0 |

(A)

| RELATIONSHIP IDENTIFIER | ANALYST IDENTIFIER |
|---|---|
| R40 | A11 |
| R41 | A11 |
| R42 | A11 |
| R43 | A22 |
| R44 | A22 |

(B)

ANALYSIS DEVICE, ANALYSIS METHOD AND COMPUTER-READABLE RECORDING MEDIUM

CROSS REFERENCE TO RELATED APPLICATIONS

This application is a national stage application of International Application No. PCT/JP2014/004320 entitled "ANALYSIS DEVICE, ANALYSIS METHOD AND COMPUTER-READABLE RECORDING MEDIUM" filed on Aug. 22, 2014. This application is incorporated herein by reference in its entirety.

TECHNICAL FIELD

The present invention relates to an analysis device, an analysis method, and a computer-readable recording medium.

BACKGROUND ART

In information systems of companies, government organizations, or the like, the necessity for taking security measures against so-called cyber terrorism is increasing. When taking security measures, it is preferable to take measures, by considering an intention or purpose of an attacker trying to do any harm to an information system, for inhibiting the intention or purpose.

In a security monitoring operation that is one security measure, various techniques are used. There are techniques such as Intrusion Detection System (IDS), SIEM (Security Information and Event Management), and the like, for example.

PTL 1 describes a system or the like for protecting a computer from malware. The system described in PTL 1 protects in advance a computer from malware by collecting local machine events and aggregating knowledge bases from an anti-malware service and another event detection system.

PTL 2 describes a method for monitoring behaviors of suspicious malware monitored during installation of a file in which a plurality of activities on a computer system executed in a predetermined time frame in the computer system are suspicious.

PTL 3 describes a system or the like for malware detection. The system or the like described in PTL 3 receives an assembly language sequence from a binary file, identifies an instruction sequence from the assembly language sequence, and classifies the instruction sequence by a knowledge base of an expert system.

PTL 4 describes an analysis system that estimates an input path of unauthorized software for an execution device that executes software.

CITATION LIST

Patent Literature

[PTL 1] Japanese Laid-open Patent Publication No. 2006-285983
[PTL 2] Japanese Laid-open Patent Publication No. 2014-38596
[PTL 3] Japanese Laid-open Patent Publication No. 2012-501504
[PTL 4] Japanese Laid-open Patent Publication No. 2010-267128

SUMMARY OF INVENTION

Technical Problem

The techniques described in the patent literatures merely present information of a detected event when detecting a problem on security in an information system to be a monitoring target. In other words, it is difficult for the techniques described in the patent literatures to provide information relating to an intention or purpose of an attacker when detecting a problem on security in the information system to be a monitoring object.

The present invention has been achieved to solve the problem, and a main object thereof is to provide an analysis device capable of determining information relating to an intention or purpose of an attacker, an analysis method, and a computer-readable recording medium.

Solution to Problem

An analysis device in one aspect of the present invention includes purpose estimating means for estimating a purpose of behavior based on a predetermined behavior in a computer and knowledge information including a relation between the behavior and a purpose of executing the behavior.

Advantageous Effects of Invention

According to the present invention, an analysis device or the like capable of determining information relating to an intention or purpose of an attacker may be provided.

BRIEF DESCRIPTION OF DRAWINGS

FIG. 4 is a diagram illustrating an example of behavior or the like used by the analysis device in the first example embodiment of the present invention.

FIG. 5 is a diagram illustrating an example of a relation between behavior and a purpose used by the analysis device in the first example embodiment of the present invention.

FIG. 19 is a diagram illustrating an example of information relating to analysts involved in knowledge information including a relation between behavior and a purpose used by the analysis device 100 in the second example embodiment of the present invention.

DESCRIPTION OF EMBODIMENTS

Figure 3:
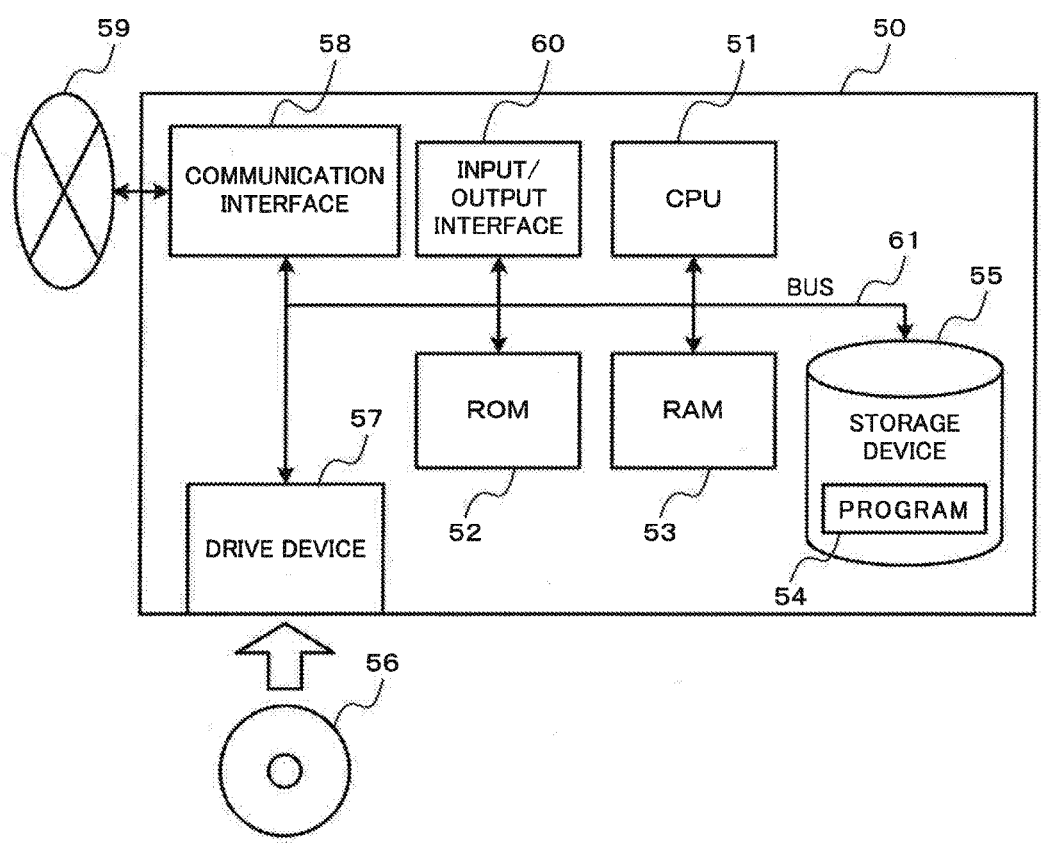
FIG. 3 is a diagram illustrating a configuration of one example of an information processing device that realizes an analysis device in each example embodiment of the present invention.

Each example embodiments of the present invention will be described with reference to the accompanying drawings. In the example embodiments of the present invention, each component of each device represents a block of a functional unit. Each component of each device may be implemented by any combination of, for example, an information processing device 50 as illustrated in FIG. 3 and software. The information processing device 50 includes, for example, a CPU (Central Processing Unit) 51, a ROM (Read Only Memory) 52, a RAM (Random Access Memory) 53, a program 54 loaded on the RAM 53, a storage device 55 that stores the program 54, a drive device 57 that performs read from/write to a storage medium 56, a communication interface 58 for connection to a network 59, an input/output interface 60 that makes an input/output of data, and a bus 61 that connects respective components. Further, an implementation method for each device includes various modified examples. Each device may be implemented, for example, as a dedicated device. Further, each device may be implemented by combining a plurality of devices.

First Example Embodiment

Figure 1:
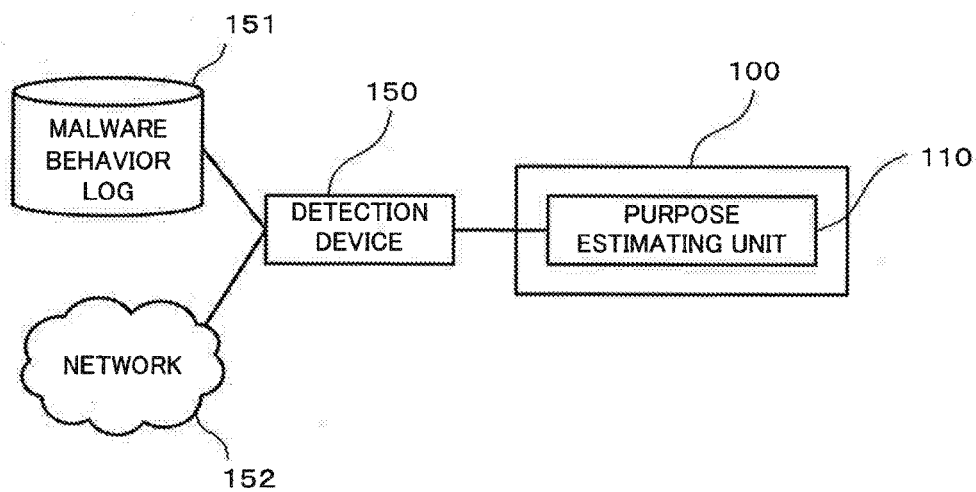
FIG. 1 is a diagram illustrating a configuration of an analysis device in a first example embodiment of the present invention and an analysis system or the like including the analysis device.
Figure 2:
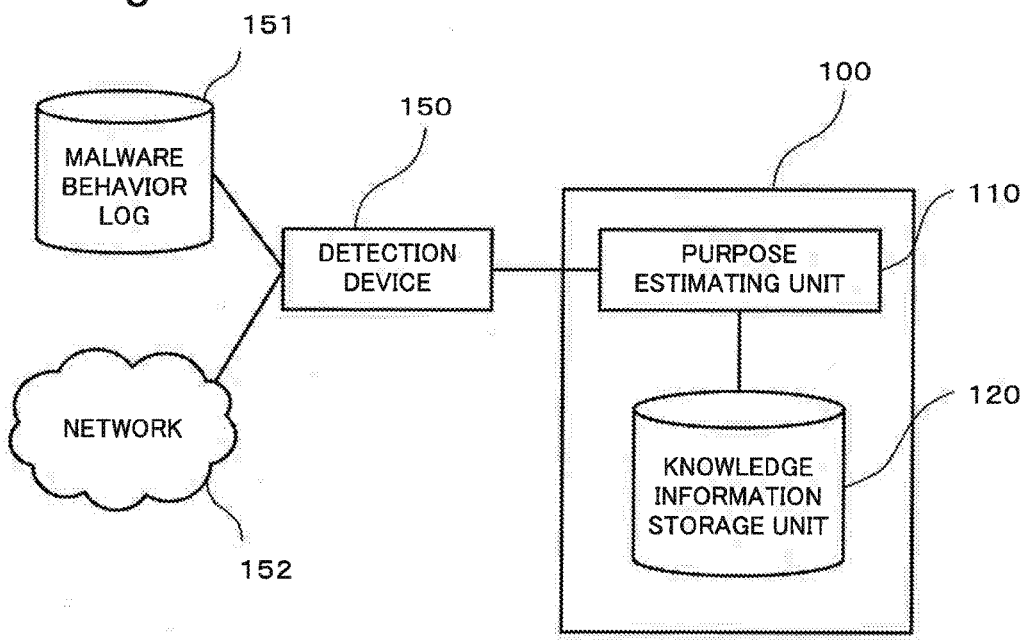
FIG. 2 is a diagram illustrating another configuration of the analysis device in the first example embodiment of the present invention and an analysis system or the like including the analysis device.
Figure 6:
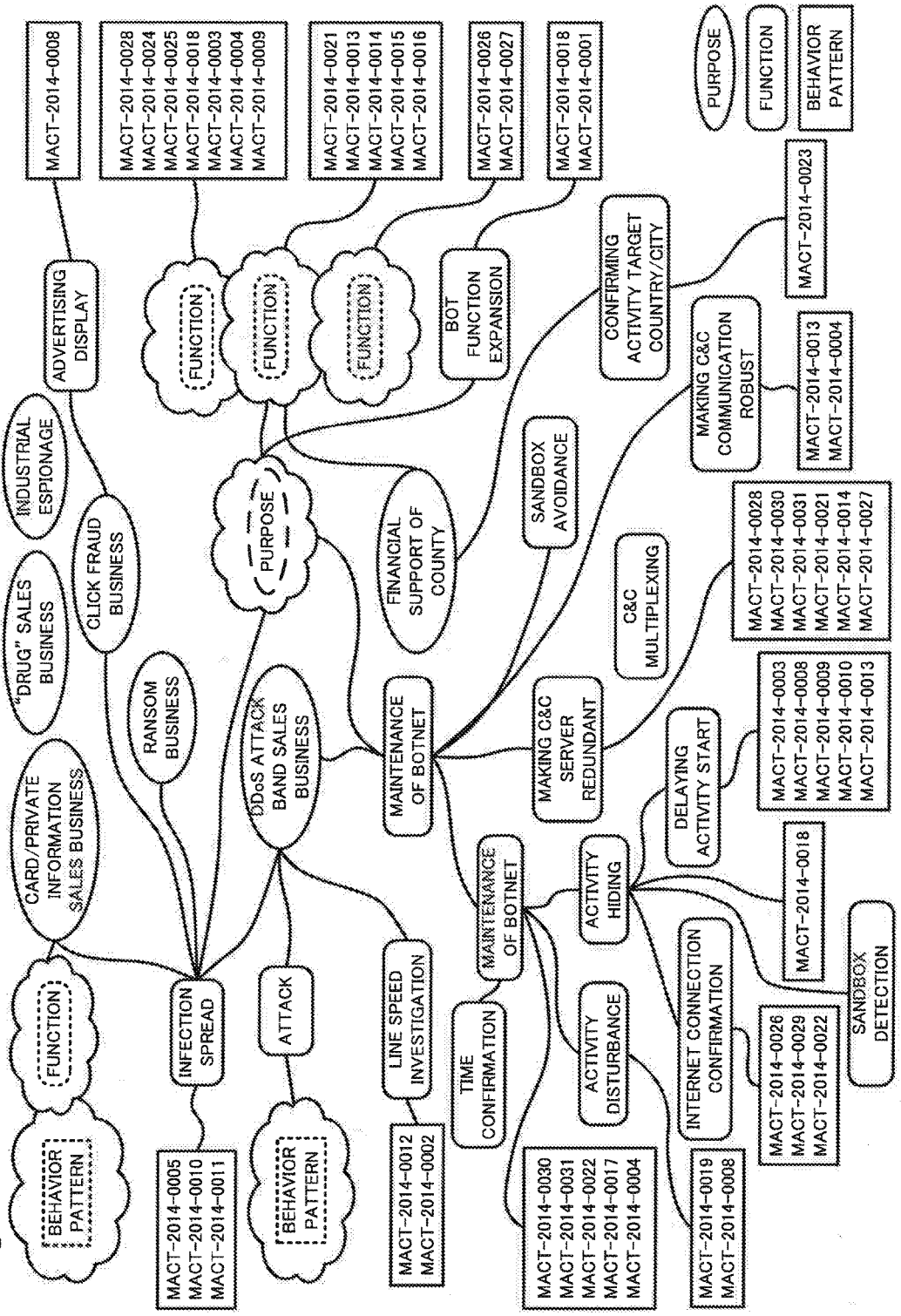
FIG. 6 is a diagram illustrating an example of knowledge information used by the analysis device in the first example embodiment of the present invention.
Figure 7:
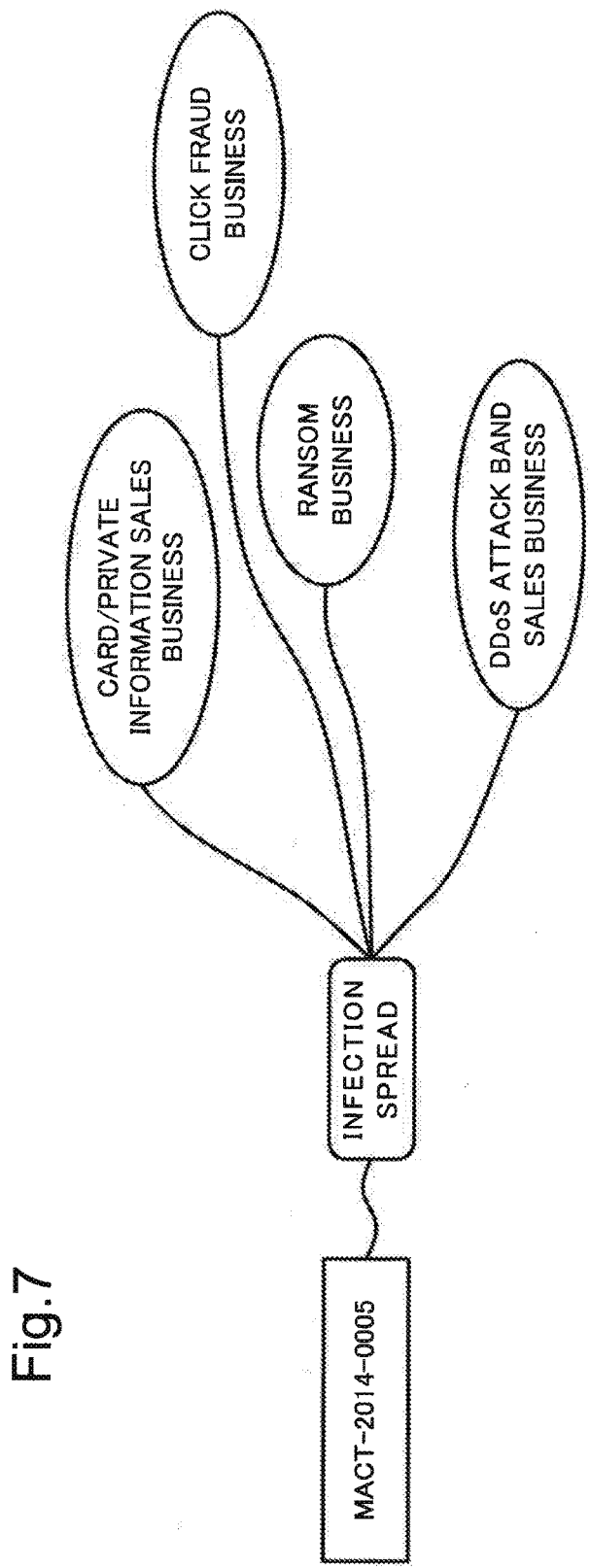
FIG. 7 is an example of purposes of behavior estimated by the analysis device in the first example embodiment of the present invention.
Figure 8:
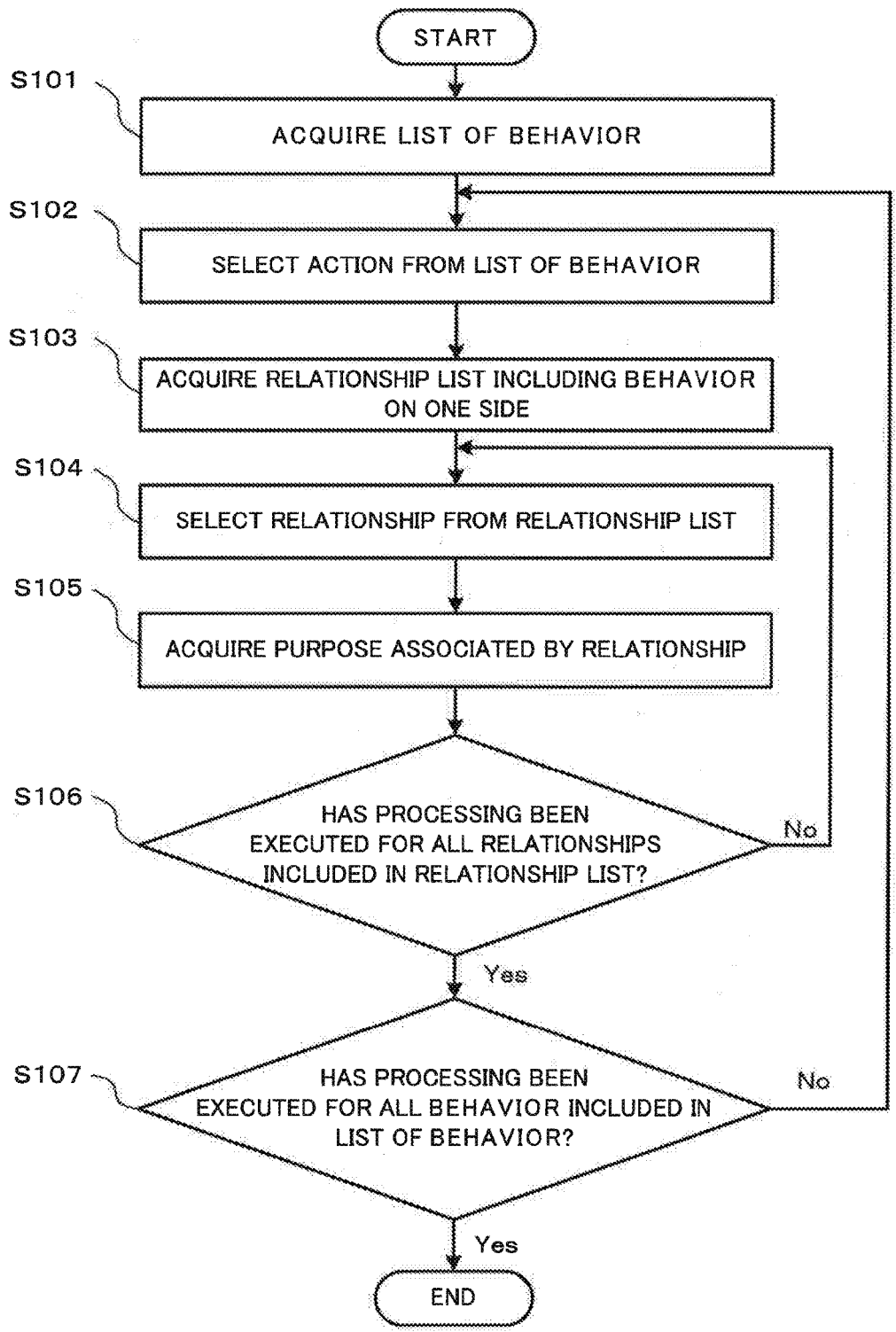
FIG. 8 is a flowchart illustrating an operation of the analysis device in the first example embodiment of the present invention.
Figure 9:
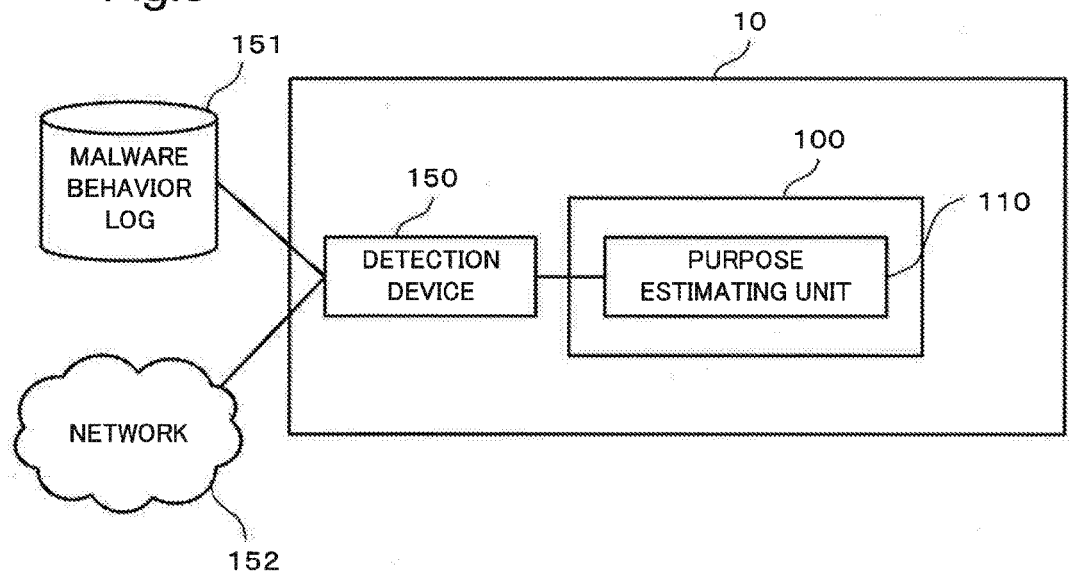
FIG. 9 is a diagram illustrating a configuration of a modified example of the analysis device in the first example embodiment of the present invention.
Figure 10:
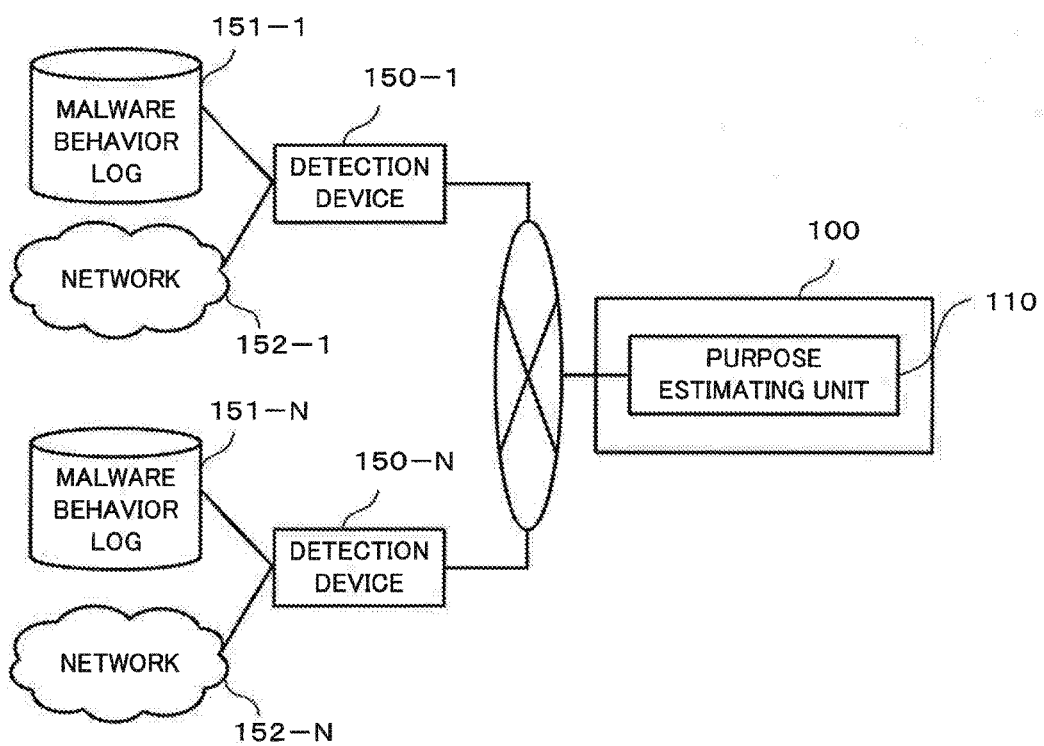
FIG. 10 is a diagram illustrating a configuration of a modified example of the analysis device in the first example embodiment of the present invention.
Figure 11:
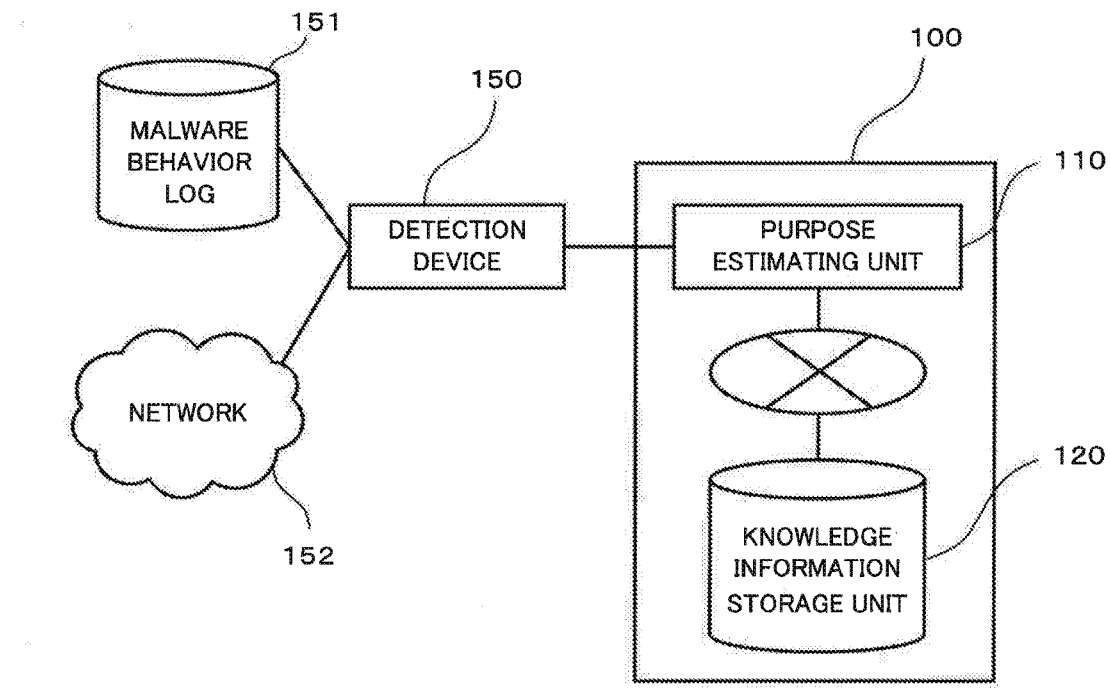
FIG. 11 is a diagram illustrating a configuration of another modified example of the analysis device in the first example embodiment of the present invention.
Figure 12:
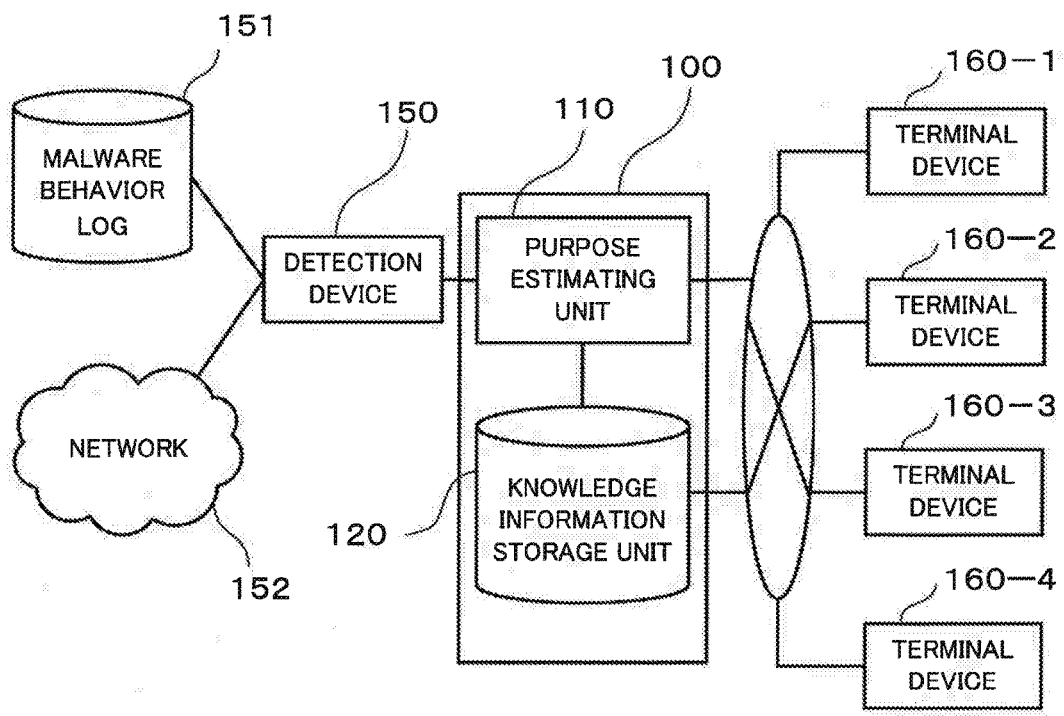
FIG. 12 is a diagram illustrating a configuration of another modified example of the analysis device in the first example embodiment of the present invention.

First, a first example embodiment of the present invention will be described. FIG. 1 is a diagram illustrating a configuration of an analysis device in the first example embodiment of the present invention and an analysis system or the like including the analysis device. FIG. 2 is a diagram illustrating another configuration of the analysis device in the first example embodiment of the present invention and an analysis system or the like including the analysis device. FIG. 4 is a diagram illustrating an example of a behavior pattern or the like used by the analysis device in the first example embodiment of the present invention. FIG. 5 is a diagram illustrating an example of a relation between a behavior pattern and a purpose used by the analysis device in the first example embodiment of the present invention. FIG. 6 is a diagram illustrating an example of knowledge information used by the analysis device in the first example embodiment of the present invention. FIG. 7 is an example of purposes of behavior estimated by the analysis device in the first example embodiment of the present invention. FIG. 8 is a flowchart illustrating an operation of the analysis device in the first example embodiment of the present invention. FIG. 9 and FIG. 10 are diagrams each illustrating a configuration of a modified example of the analysis device in the first example embodiment of the present invention. FIG. 11 and FIG. 12 are diagrams each illustrating a configuration of another modified example of the analysis device in the first example embodiment of the present invention.

As illustrated in FIG. 1, an analysis device 100 according to the first example embodiment of the present invention includes a purpose estimating unit 110. The purpose estimating unit 110 estimates a purpose of the predetermined behavior based on predetermined behavior in a computer and knowledge information including a relation between the predetermined behavior and a purpose of executing the predetermined behavior.

As one example of the present example embodiment, as illustrated in FIG. 2, the analysis device 100 may be configured to cause a knowledge information storage unit 120 to store knowledge information including a relation between behavior and a purpose of executing the behavior. In this case, the purpose estimating unit 110 estimates a purpose of behavior using the knowledge information stored on the knowledge information storage unit 120. However, the analysis device 100 may have, without limitation to such a configuration, any configuration such that knowledge information is usable by the purpose estimating unit 110.

First, knowledge information and components thereof used in the analysis device 100 in the present example embodiment will be described. In the present example embodiment, the knowledge information is information used when the analysis device 100 estimates the purpose of the behavior. The knowledge information includes at least certain behavior, a purpose of the behavior, and a relation between the behavior and the purpose.

In the present example embodiment, the behavior is, for example, some sort of operation in a computer connected to a network, and is, for more detail, a characteristic operation performed by malicious, bad software or the like such as malware.

The behavior mainly to be an estimation object of the purpose by the analysis device 100 in the present example embodiment is, for example, behavior of malware detected by a detection device 150 that detects an operation of malware or the like.

The detection device 150 is, for example, the above-described IDS or the SIEM tools, and detects an operation of malware using a publicly known technique. The detection device 150 detects an operation of malware by determining whether, for example, there is a pattern in which an operation recorded on a malware behavior log 151 corresponds to a behavior pattern recording behavior of malware. The malware behavior log 151 includes network communication carried out when malware is operated, a call of API (Application Programming Interface), and a record of operations of a computer such as access to a file or memory. Further, the detection device 150 may also detect an operation of malware or the like by reading a communication content in a network 152 and determining whether there is a pattern in which the read operation corresponds to a behavior pattern.

FIG. 4(A) is one example of the malware behavior log 151. FIG. 4(B) is one example of a behavior pattern used in the detection device 150. In the present example embodiment, the behavior pattern refers to one or more behavior of malware to be detected by the detection device 150. The detection device 150 indicates, for example, when each of operations recorded on the malware behavior log corresponds to any one of behavior included in a behavior pattern, the fact together with corresponding behavior as detection of an operation of malware or the like. As one specific example, in an operation L01 listed on the malware behavior log illustrated in FIG. 4(A), "Action" is "Wait" in the same manner as "Action" of the behavior pattern P01. Further, in the operation L01, "4948" that is a value of "Duration" is larger than 300 that is a value of "DurationMin" of the behavior pattern P01 and is smaller than "86400" that is a value of "DurationMax." Therefore, the operation L01 corresponds to the behavior pattern P01 illustrated in FIG. 4(B). In this case, the detection device 150 outputs, in any format, a fact that an operation of malware has been detected together with the behavior pattern P01 illustrated in FIG. 4(B).

Further, in the present example embodiment, the purpose refers to, for example, a matter intended to be achieved by an attacker using malware by executing the above-described behavior in a computer. In the present example embodiment, the purpose is not limited to items relevant to a component or operation of an information system or the like. For example, the analysis device 100 in the present example embodiment may treat, as a purpose, an item in which there is no explanation on what will happen to a component or operation of an information system or the like, such as "a private information sales business." In other words, the purpose in the present example embodiment may include a socially achieved item such as making money and the like. Note that in this case, an attacker is, for example, a person having an intention of doing any harm to a network or information system. The relation between behavior and a purpose of executing the behavior is a relation associating the above-described behavior with a purpose of executing the behavior using malware by an attacker.

Note that the above-described purpose is conceivable to be achieved by one or more functions. Further, the above-described behavior is conceivable to be one in which a part of a certain function has appeared. Therefore, the relation between behavior and a purpose of executing the behavior is not limited to a case where these are directly associated with each other. In other words, the relation between behavior and a purpose of executing the behavior may be represented using a relation between behavior and a function achieved by the behavior and a relation between the function and a purpose of executing the function. The knowledge information includes a function, a relation between behavior and the function, and a relation between the function and a purpose.

Further, the above-described purpose or function may be made specific as a more detailed function or purpose. In other words, the purpose and function may be hierarchical. In such a case, a relation between behavior and a purpose of executing the behavior may be further expressed using a relation between purposes or a relation between functions. The knowledge information includes these relations.

FIG. 5 is a diagram illustrating one example of a relation between behavior and a purpose of executing the behavior. In FIG. 5, in other words, the relation between behavior and a purpose of executing the behavior is represented using a relation between behavior and a function achieved by the behavior and a relation between the function and a purpose of executing the function.

As illustrated in FIG. 5(A), for example, behavior of "Time wait" detected by the detection device 150 or the like is associated with a function of "Making a detection of bot difficult." Further, the function of "Making a detection of bot difficult" is associated with a purpose of "sales business of bandwidth for DDoS (Distributed Denial of Service) attack". Thus, based on a relation illustrated in FIG. 5(A), it is conceivable that the behavior of "Wait for time" is performed for "sales business of bandwidth for DDoS attack" as a purpose, for example. Further, the behavior, function, purpose, and relation are represented by assigning identifiers to the respective items, for example, as illustrated in each of FIGS. 5(B) to 5(E).

FIG. 6 illustrates one example of the knowledge information. The knowledge information as illustrated in FIG. 6 is generated, for example, on the basis of knowledge and experience of an analyst capable of conceiving a real purpose or intention of attackers from a fact detected by the detection device 150 as described above or the like. However, the knowledge information as illustrated in FIG. 6 may be generated by any method. Further, when the analysis device 100 includes the knowledge information storage unit 120, the relation illustrated in FIG. 5 or the knowledge information illustrated in FIG. 6 is stored, for example, on the knowledge information storage unit 120. Further, the analysis device 100 may display the relation illustrated in FIG. 5 or the knowledge information illustrated in FIG. 6 on a display device or the like that is not illustrated.

Next, the components of the analysis device 100 in the present example embodiment will be described in detail. In the present example embodiment, the purpose estimating unit 110 estimates the purpose of the behavior, based on predetermined behavior in a computer and a relation between the behavior and a purpose of executing the behavior.

The purpose estimating unit 110 estimates the purpose of executing behavior, for example, based on the relation between the behavior and the purpose illustrated in FIG. 5 or the knowledge information illustrated in FIG. 6 as described above. In other words, the purpose estimating unit 110 identifies the purpose associated with the behavior based on the relation or the knowledge information. The purpose estimating unit 110 estimates the identified purpose as the purpose of executing the behavior. When based on the relation between the behavior and the purpose illustrated in FIG. 5, for example, the purpose estimating unit 110 may identify that the behavior of "Wait for time" is associated with the purpose of "sales business of bandwidth for DDoS attack". Therefore, the purpose estimating unit 110 estimates that the behavior of "Wait for time" has "sales business of bandwidth for DDoS attack" as the purpose. Further, when based on the knowledge information illustrated in FIG. 6, the purpose estimating unit 110 estimates that behavior labeled with "MACT-2014-0005" has at least one of purposes illustrated in FIG. 7 as the purpose. In other words, the purpose estimating unit 110 estimates that the behavior has, as a purpose, at least one of "sales business for Card/private information", "Click fraud business", "Ransom business", or "sales business of bandwidth for DDoS attack". Further, the analysis device 100 may output, in any format, the relation between the behavior and the purposes estimated by the purpose estimating unit 110 as illustrated in FIG. 7. The analysis device 100 may display the relation between the behavior and the purpose on a display device or the like, not illustrated, or output the relation to any file, for example.

Next, using FIG. 8, one example of an operation of the analysis device 100 in the present example embodiment will be described.

The purpose estimating unit 110 of the analysis device 100 first acquires a list of behavior to be an estimation object of a purpose (step S101).

Then, the analysis device 100 acquires one of behavior included in the list from the list of behavior acquired in step S101 (step S102). In this case, the analysis device 100 may acquire one of behavior from the list based on any criteria.

Then, the purpose estimating unit 110 acquires a list of relations on the basis of the behavior acquired in step S102 (step S103). When the analysis device 100 includes the knowledge information storage unit 120, a list of relations is read from the knowledge information storage unit 120.

Then, the purpose estimating unit 110 selects, from the list of relations, a relation including the behavior selected in step S102 on one side (step S104).

Then, the purpose estimating unit 110 acquires, using the relation selected in step S104, a purpose associated with the behavior acquired in step S102 by the relation (step S105). When the relation selected in step S104 does not directly associate the above-described behavior with the purpose of executing the behavior, the purpose estimating unit 110 estimates the purpose by sequentially following a relation included in the relation list from the relation described above.

Then, the purpose estimating unit 110 confirms whether the process of step S104 and step S105 has been executed for all the relations included in the list of relations acquired in step S103. (step S106). When the process has not been executed for all the relations, the purpose estimating unit 110 returns to step S104 and continues the process by selecting a relation having not been subjected to the process among the relations included in the above-described relation list. When the process has been executed for all the relations, the purpose estimating unit 110 moves to process of next step S107.

Then, the purpose estimating unit 110 confirms whether process has been executed for all the behavior included in the list of behavior (step S107). When the process has not been executed for all the behavior (step S107: No), the purpose estimating unit 110 returns to step S102 and continues the process by selecting behavior having not been subjected to the process from the above-described list of behavior.

When the process has been executed for all the behavior (step S107: Yes), the analysis device estimates the purpose acquired in step S105 by the purpose estimating unit 110 as the purpose of executing the behavior and terminates the process. Note that the analysis device 100 may output the estimated purpose in any format.

As described above, in the analysis device 100 in the present example embodiment, the purpose estimating unit 110 estimates the purpose of the behavior, based on the predetermined behavior in a computer and the relation between the behavior and the purpose of executing the behavior. Therefore, the analysis device 100 according to the present example embodiment may determine information relating to an intention or purpose of an attacker.

In common security monitoring operation, it is not always easy to estimate, from the behavior of malware or the like detected by the above-described technique such as IDS, SIEM and the like, an intention of an attacker using malware or a purpose of carrying out an attack by the attacker. The possibility of estimating an intention or purpose of an attacker from behavior of malware or the like is generally limited to an analyst having much knowledge and analysis experience relating to activities of malware or the like.

However, when the analysis device 100 in the present example embodiment is used, it is possible to estimate an intention or purpose of an attacker from behavior, for example, even by an analyst having less knowledge and analysis experience relating to activities of malware or the like. In other words, when the analysis device 100 in the present example embodiment is used, it is possible that an analyst having less knowledge and analysis experience relating to activities of malware or the like, for example, takes measures for inhibiting a real intention or purpose of an attacker.

Modified Examples of First Example Embodiment

In the analysis device 100 in the present example embodiment, various modified examples are conceivable. In the present example embodiment, for example, behavior to be an estimation object of the purpose is not limited to behavior detected in the detection device 150. The analysis device 100 in the present example embodiment may regard any behavior for estimating a purpose thereof as an estimation object of the purpose.

Further, when the analysis device 100 in the present example embodiment estimates the purpose of the behavior detected in the detection device 150, the analysis device 100 and the detection device 150 may execute various operations.

The detection device 150 may be configured, for example, to be connected to the network 152 to be monitored in which malware is being executed, and detect an operation of the malware every time receiving a packet from the network 152. Further, in this case, when the detection device 150 detects the operation of the malware, the analysis device 100 may estimate a purpose of the behavior of the malware detected in the detection device 150. By this means, an analyst may analyze the malware while observing the behavior of the malware in real time.

Further, as a specific structure of the analysis device 100, various configurations are conceivable. For example, the analysis device 100 and the detection device 150 or the like may be configured as one analysis system. FIG. 9 illustrates one example in which the analysis device 100 and the detection device 150 are configured as an analysis system 10 integrated. Further, the analysis device 100 and one or more detection devices 150-1 . . . N may be configured to be connected via a network, as illustrated in FIG. 10.

Further, when the analysis device 100 includes the knowledge information storage unit 120, the purpose estimating unit 110 and the knowledge information storage unit 120 may be configured to be connected via a network, as illustrated in FIG. 11. In this case, for example, as a cloud service, a configuration can be made in such a way that the knowledge information stored on the knowledge information storage unit 120 is provided for a plurality of the purpose estimating units 110.

Further, the analysis device 100 in the present example embodiment may be configured to be provided as a so-called cloud service, as illustrated in FIG. 12. In this case, the user of the analysis device 100 is connected to the analysis device 100 via a network using, for example, a terminal device 160. When such a configuration is made, knowledge information stored on the knowledge information storage unit 120 of the analysis device 100 is shared by a plurality of analysts.

Second Example Embodiment

Figure 13:
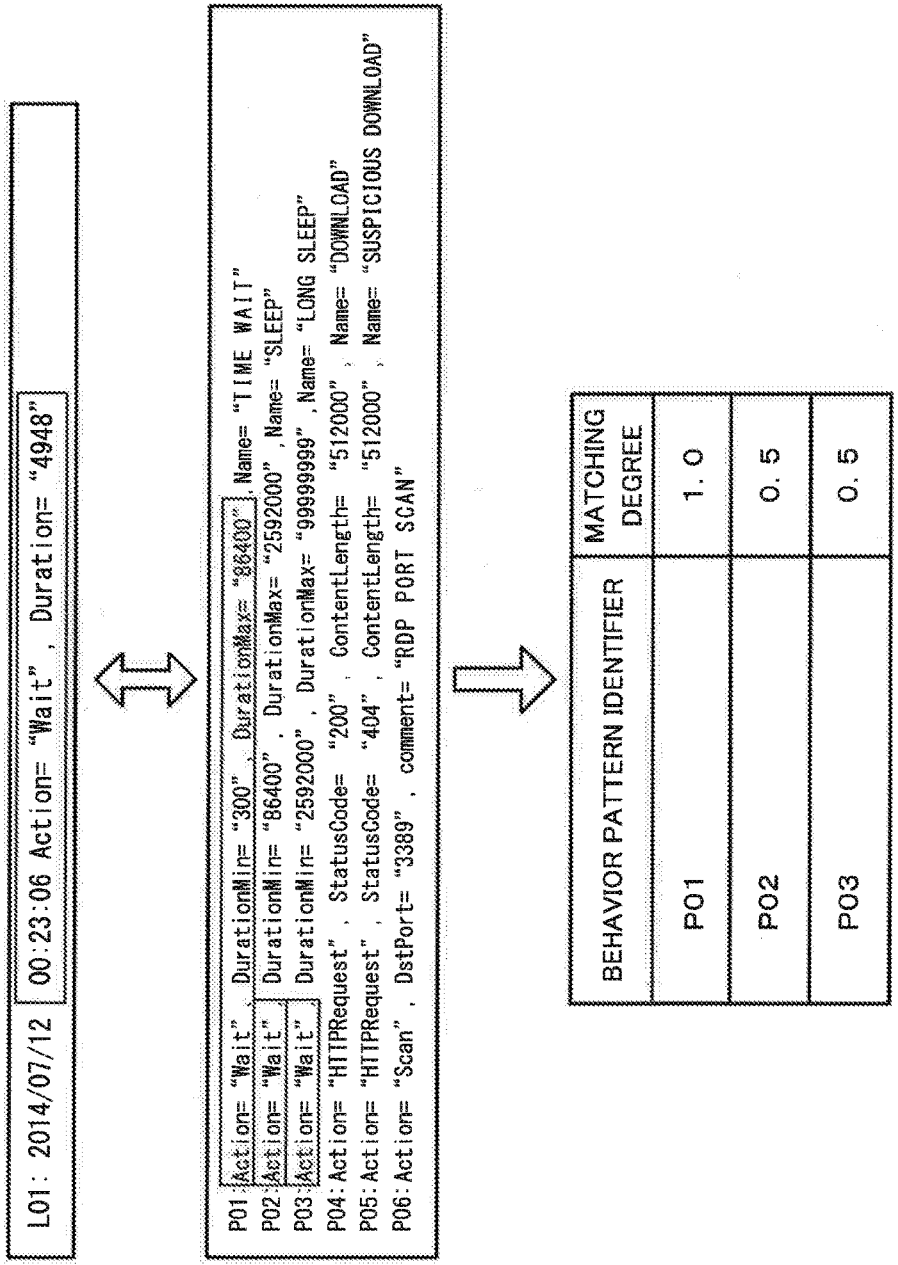
FIG. 13 is a diagram illustrating an example of a method for calculating a matching degree of behavior used by an analysis device in a second example embodiment of the present invention.
Figure 14:
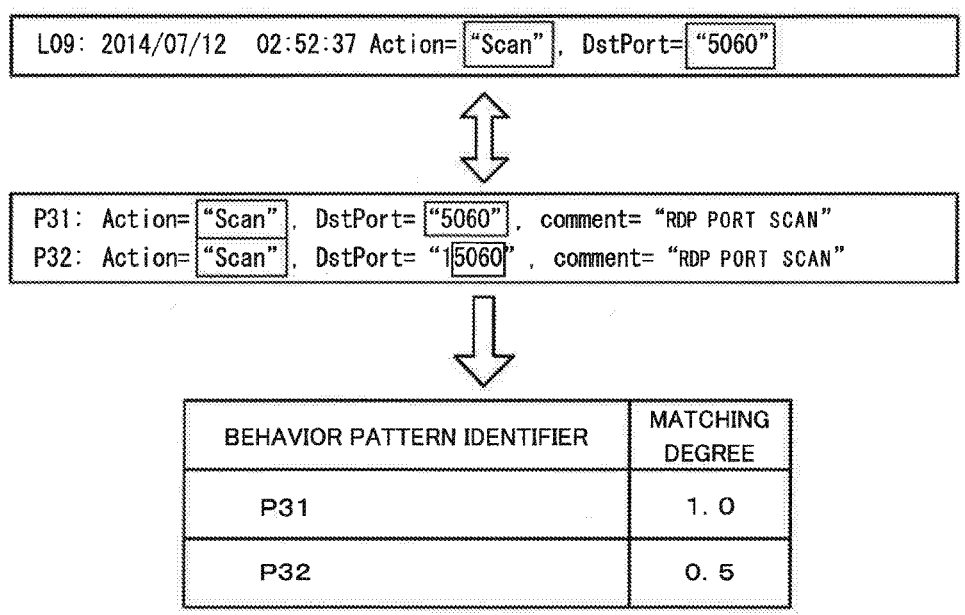
FIG. 14 is a diagram illustrating another example of the method for calculating a matching degree of behavior used by the analysis device in the second example embodiment of the present invention.
Figure 15:
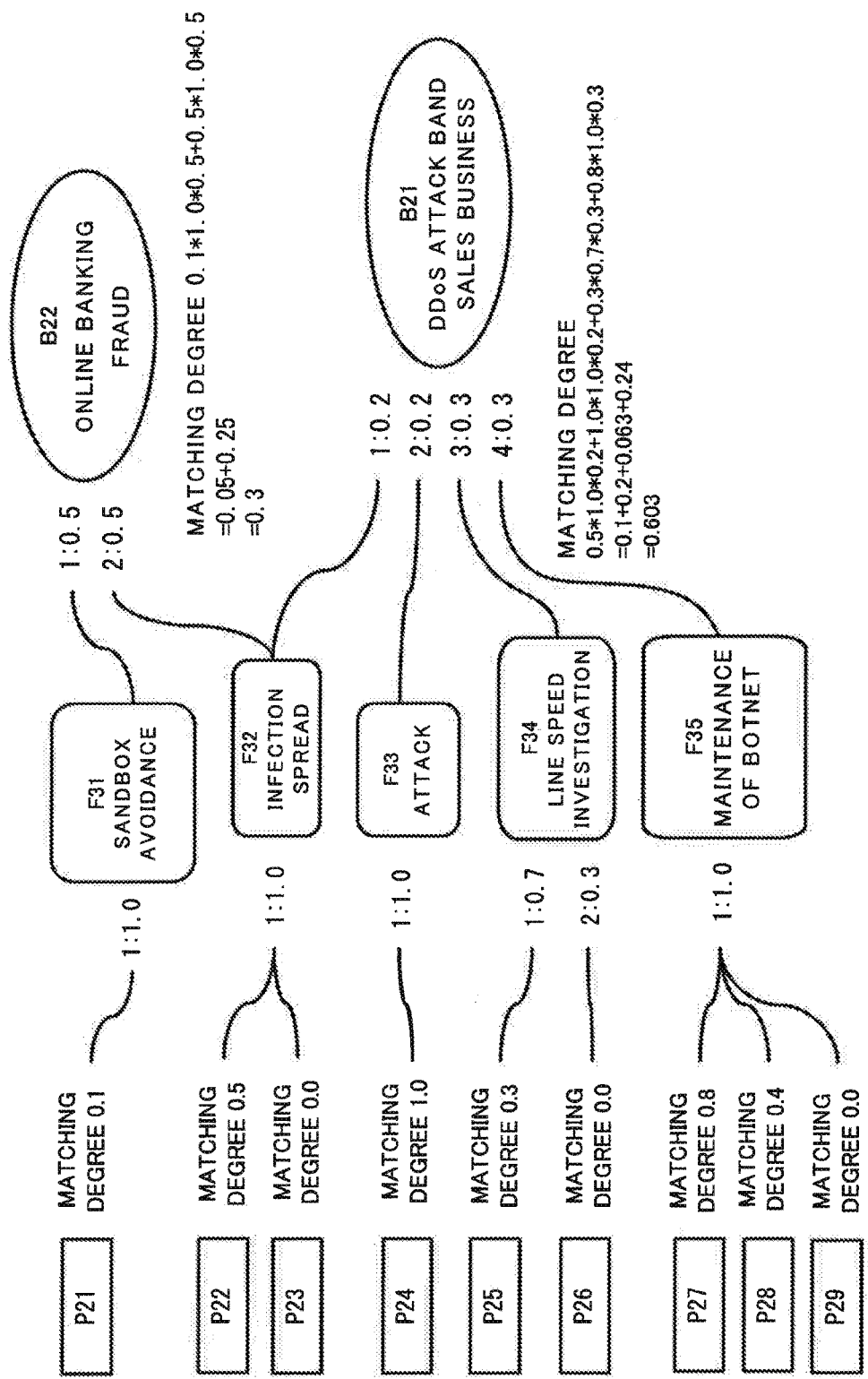
FIG. 15 is a diagram illustrating an example of an estimating method in which the analysis device in the second example embodiment of the present invention estimates a purpose using a matching degree of behavior.
Figure 16:
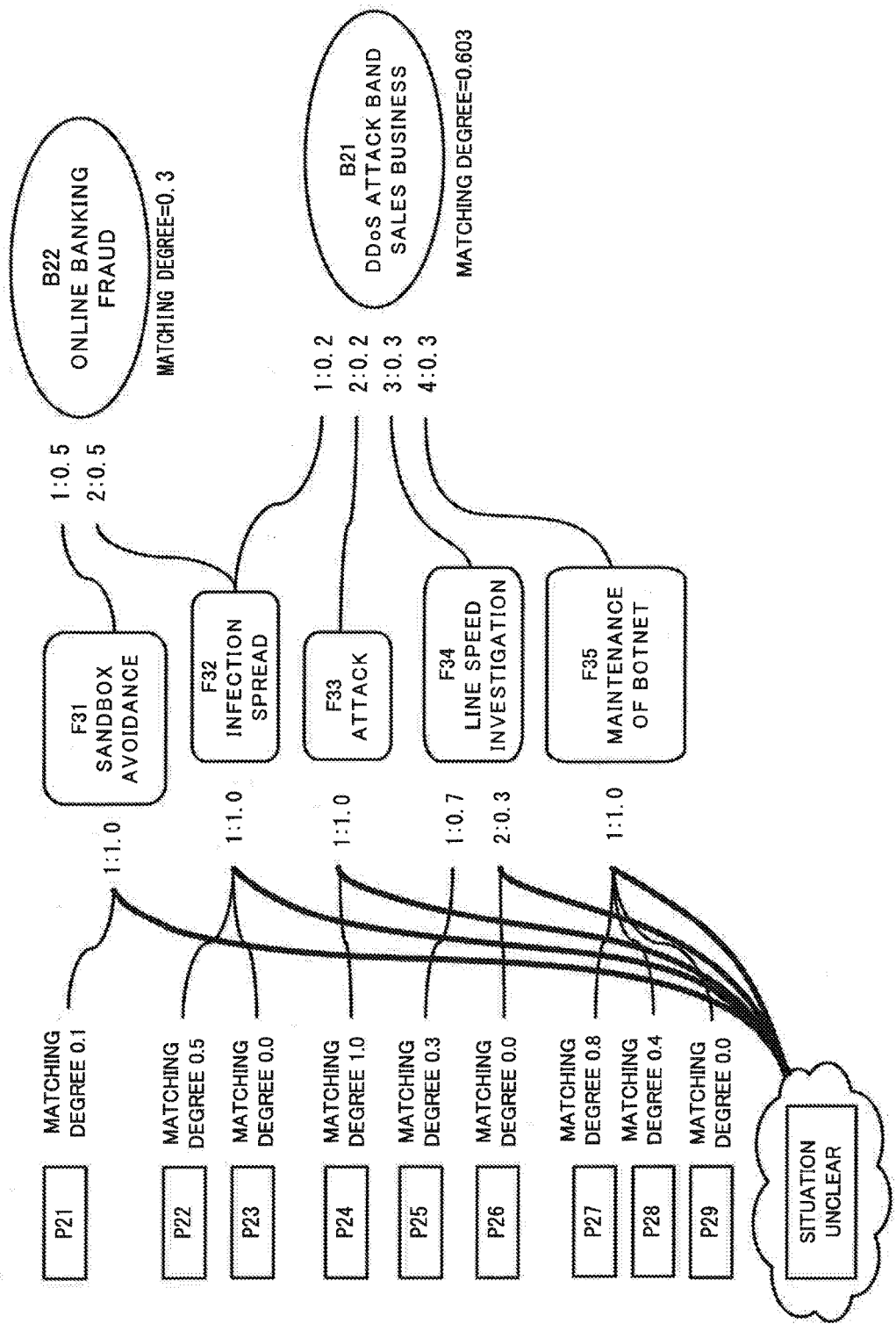
FIG. 16 is a diagram illustrating an example in which additional information is identified for knowledge information used by an analysis device 100 in the second example embodiment of the present invention.
Figure 17:
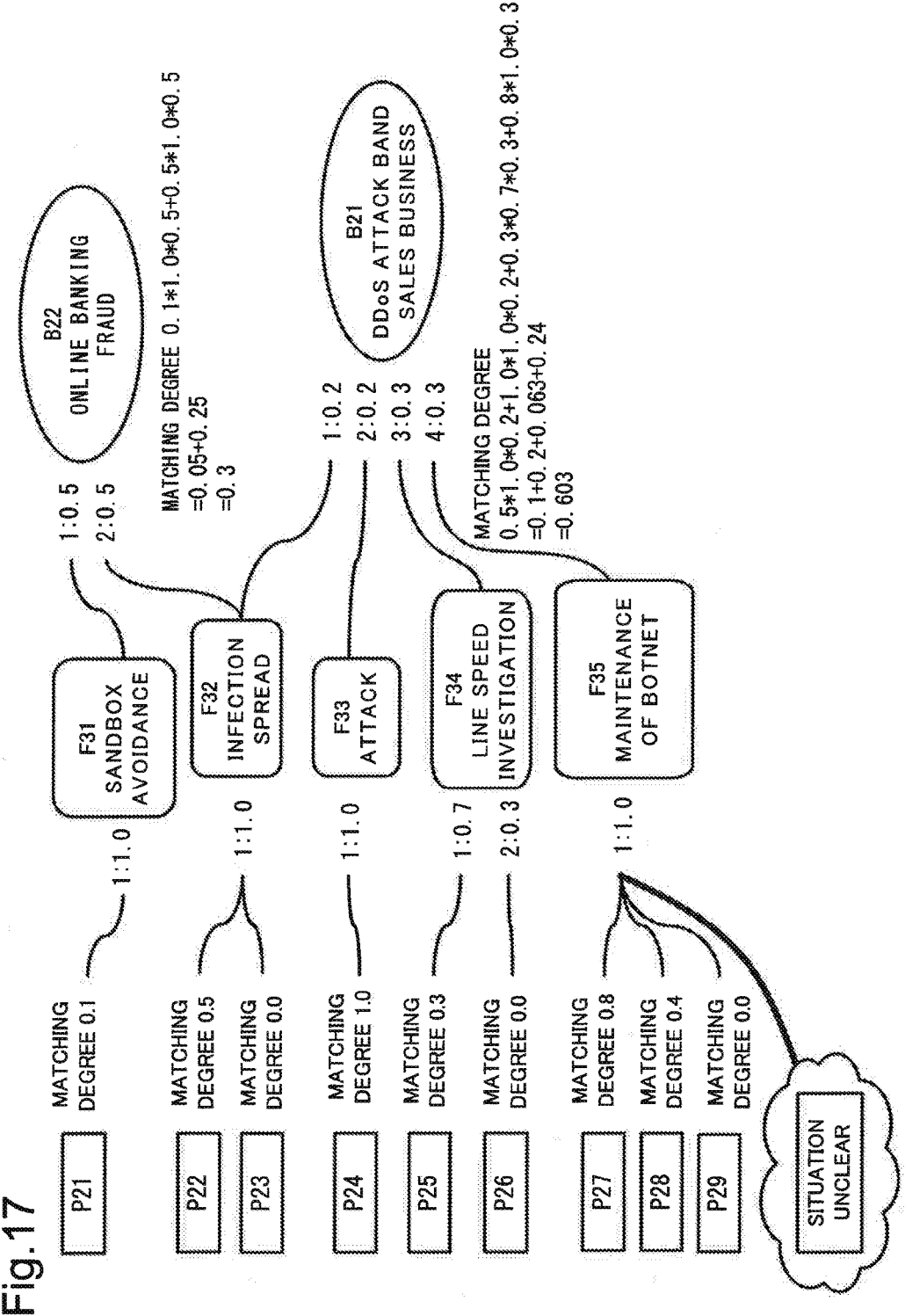
FIG. 17 is a diagram illustrating another example in which additional information is identified for the knowledge information used by the analysis device 100 in the second example embodiment of the present invention.
Figure 18:
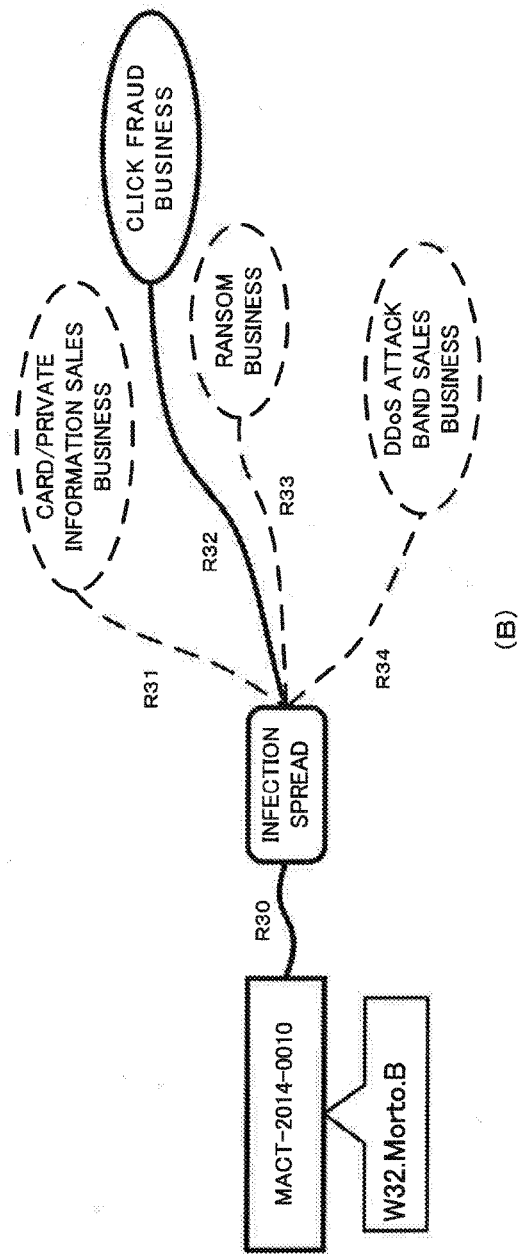
FIG. 18 is a diagram illustrating an example of information indicating an association between behavior and malware causing the behavior used by the analysis device 100 in the second example embodiment of the present invention.

Next, a second example embodiment of the present invention will be described. FIG. 13 is a diagram illustrating an example of a method for calculating a matching degree of behavior used by an analysis device in the second example embodiment of the present invention. FIG. 14 is a diagram illustrating another example of the method for calculating a matching degree of behavior used by the analysis device 100 in the second example embodiment of the present invention. FIG. 15 is a diagram illustrating an example of an estimating method in which an analysis device 100 in the second example embodiment of the present invention estimates the purpose using a matching degree of behavior. FIG. 16 is a diagram illustrating an example in which additional information is identified for knowledge information used by the analysis device 100 in the second example embodiment of the present invention. FIG. 17 is a diagram illustrating another example in which additional information is identified for the knowledge information used by the analysis device 100 in the second example embodiment of the present invention. FIG. 18 is a diagram illustrating an example of information indicating an association between behavior and malware causing the behavior used by the analysis device 100 in the second example embodiment of the present invention. FIG. 19 is a diagram illustrating an example of information relating to analysts involved in knowledge information including a relation between behavior and a purpose used by the analysis device 100 in the second example embodiment of the present invention.

The analysis device 100 according to the present example embodiment may have the same configuration as the analysis device 100 according to the first example embodiment of the present invention. The analysis device 100 in the present example embodiment is different from the analysis device 100 in the first example embodiment of the present invention in a point that the purpose of the behavior is estimated using additional information relating to the behavior or the relation between the behavior and the purpose.

When determining a purpose for behavior of malware detected in the detection device using the analysis device 100 in the present example embodiment, there may be a case such that a plurality of behavior is detected, or as a result, a plurality of purposes may be estimated. A possibility in which the purpose estimated from the behavior is matched with an actual purpose intended to be achieved by an attacker using the behavior may differ depending on each of the purpose.

The analysis device 100 in the present example embodiment estimates the purpose of behavior using additional information relating to behavior or a relation between behavior and a purpose. By this means, the analysis device 100 in the present example embodiment may improve accuracy in estimating the purpose.

(Example of a Case where Additional Information is Matching Degree of Behavior)

An example of additional information used by the analysis device 100 in the present example embodiment will be described. As one example, the analysis device 100 uses, as additional information, a matching degree of behavior to be an estimation object of the purpose regarding an operation of malware.

In the configuration illustrated in FIG. 1, for example, although the behavior of malware detected by the detection device 150 is completely matched with a behavior pattern of malware held on the detection device 150 in some cases, the behavior is partially matched with the behavior pattern in other cases. Therefore, the analysis device 100 in the present example embodiment uses an extent of matching between behavior to be an estimation object of a purpose and previously identified behavior of malware as a matching degree of behavior and estimates the purpose of the behavior.

Using FIG. 13 to FIG. 15, an example of a calculating method for a matching degree and an estimating method for a purpose by the analysis device 100 using the matching degree will be described. In this example, a matching degree is calculated by the detection device 150. Note that a matching degree of the behavior is not always calculated by the detection device 150. The matching degree of the behavior may be also calculated, for example, by being provided by an analyst for each of the behavior based on experience thereof. The matching degree of the behavior may be calculated using any method when being a type usable by the analysis device 100.

FIG. 13 illustrates an example of the calculating method for the matching degree of the behavior. In the example illustrated for the calculating method for the matching degree, an operation L01 is stored on the malware behavior log as an operation of malware. Further, the detection device 150 uses patterns from P01 to P06 as the behavior patterns. In this case, the operation L01 is matched with the behavior pattern P01 in "Action." Further, a value of "Duration" of the operation L01 is included between a value of "DurationMin" and a value of "DurationMax" of the behavior pattern P01. In other words, the operation L01 corresponds to the behavior pattern P01. Further, "Action" of the operation L01 is matched with "Action" of the behavior pattern P02 or P03. In other words, the operation L01 is matched with a part of the behavior pattern P02 or P03. In this case, the detection device 150 sets a matching degree of the behavior pattern P01 for the operation L01 as, for example, 1.0. Further, the detection device 150 sets a matching degree of the behavior pattern P02 or P03 for the operation L01 as, for example, 0.5.

FIG. 14 illustrates another example of the calculating method for a matching degree of behavior. In the example illustrated in FIG. 14, an operation L09 is stored on a malware behavior log as an operation of malware. Further, the detection device 150 uses patterns of P31 and P32 as the behavior patterns. In this case, the operation L09 is matched with both the behavior patterns P31 and P32 in "Action." Further, a value of "DstPort" of the operation L09 is matched with a value of "DstPort" of the behavior pattern P31. The value of "DstPort" of the operation L09 is matched with a value of "DstPort" of the behavior pattern P32 in a part of the digits of the latter. In other words, the operation L09 corresponds to the behavior pattern P31. Further, the operation L09 is matched with a part of the behavior pattern P32. In this case, the detection device 150 sets a matching degree of the behavior pattern P31 for the operation L09 as, for example, 1.0. Further, the detection device 150 sets the matching degree of the behavior pattern P32 for the operation L09 as, for example, 0.5.

Next, using FIG. 15, one example of an estimating method for a purpose by the analysis device 100 in which a matching degree of behavior has been provided will be described. In FIG. 15, behavior P21 to P29, that are estimation objects of the purposes, are associated with a purpose B21 or B22 via functions F31 to F35. Further, each of the behavior P21 to P29 is assigned with a matching degree.

As one example in which a matching degree of behavior has been provided, the analysis device 100 estimates the purpose from the behavior and, in addition, calculates the matching degree for the estimated purpose. In this case, the analysis device 100 calculates the matching degree of each of the functions F31 to F35 on the basis of the matching degrees of the behavior P21 to P29. Further, the analysis device 100 calculates, on the basis of the matching degree of each of the functions F31 to F35 as one example, each of the matching degree of purposes B21 and B22.

In this example, when an upper element estimated from a lower element is estimated from only one lower element, the analysis device 100 may calculate the matching degree of the upper element as the same as that of the lower element as a basis for estimation. In the example illustrated in FIG. 14, a relation between the behavior P21 and the function F31 corresponds thereto.

Further, in this example, to estimate an upper element estimated from a lower element from a plurality of lower elements and achieve the upper element, each of the plurality of lower elements may be needed. In this case, the analysis device 100 calculates, for example, a value obtained by weighting a matching degree of each of the plurality of lower elements as the matching degree of the upper element. In the example illustrated in FIG. 15, the analysis device 100 weights matching degrees of the associated behavior P25 and P26 by 0.7 and 0.3, respectively, and calculates a matching degree of the function F34 as 0.3*0.7+ 0.0*0.3=0.21. Note that "*" is a sign indicating multiplication.

Further, in this example, to estimate an upper element estimated from a lower element from a plurality of lower elements and achieve the upper element, there may be a case only any one of the plurality of lower elements is sufficient. In this case, the analysis device 100 calculates, for example, the largest value among respective matching degrees of the plurality of lower elements as the matching degree of the upper element. In the example illustrated in FIG. 14, the analysis device 100 calculates a matching degree of the function F35 as 0.8 that is the largest matching degree among the associated behavior P27 to P29.

In the example illustrated in FIG. 15, the analysis device 100 calculates the matching degrees of the purposes B21 and B22 by the same steps as in the above description. The matching degree of the purpose B21 is calculated as 0.603, and the matching degree of the purpose B22 is 0.3, for example.

Therefore, in the example illustrated in FIG. 15, the user of the analysis device 100 may determine, on the basis of the matching degrees, that a possibility of the purpose B21 is higher among the purposes B21 and B22 estimated on the basis of the behavior P21 to P29. In other words, with an assumption that, for example, an attack to a network or an information system from the outside has "sales business of bandwidth for DDoS attack" as the purpose, the user of the analysis device 100 may take measures against the attack.

Note that in the example, the matching degree of behavior has been represented by a numerical value. However, the matching degree of behavior is not limited to the above-described format, and may be any format usable by the analysis device 100 in the present example embodiment. The matching degree of behavior may be provided, for example, in a format graded as any one of a plurality of predetermined levels.

(Example of a Case where Additional Information is History Information of Behavior)

Another example of additional information used by the analysis device 100 in the present example embodiment will be described. In this example, the analysis device 100 uses, as additional information, history information of the behavior for which a purpose has been estimated.

In this case, when estimating the purpose of the behavior, the analysis device 100 stores, as history information, the behavior having been assigned as an estimation object on the knowledge information storage unit 120 as illustrated in FIG. 2, for example. The analysis device 100 identifies, on the basis of the stored history information, the information relating to the behavior satisfying a predetermined condition on the basis of the history information, together with an estimation result of the purpose of the behavior or separately from the estimation result of the purpose.

The information relating to the behavior identified by the analysis device 100 is conceivable to include several examples. One example of such information is the information relating to the behavior that appears beyond a predetermined number of times in the history information.

In the history information, for example, behavior that always appears beyond a predetermined number of times when a purpose is estimated is not limited to only a case in which the same operation is always actually being performed by malware. For example, it is conceivable that there is a possibility that the above-described behavior may not be an appropriate condition in order to detect an operation of malware by the detection device 150. Therefore, the analysis device 100 identifies, for example, behavior that appears beyond a predetermined number of times in the history information.

The analysis device 100 may identify information relating to the above-described behavior using various methods. As one example, the analysis device 100 outputs, when detecting behavior as described above, the fact together with the purpose estimated for the behavior in any format. By this means, it is possible for the user of the analysis device 100 to, by referring to the output behavior, correct a condition for the behavior or set the behavior patterns of the detection device 150 to exclude the behavior from an object for an operation of malware detected using the detection device 150.

Further, the analysis device 100 may provide, for example, information relating to behavior that appears beyond a predetermined number of times in the history information for the detection device 150. In this case, the detection device 150 may exclude the behavior from a behavior pattern of malware to be detected.

Another example of the information relating to the behavior identified by the analysis device 100 is information relating to the number of the behavior or frequency thereof that appear in the history information.

It is conceivable that the history information held on the analysis device 100 may indicate that the number of behavior to be estimated for a purpose using the analysis device 100 decreases. In such a case, there is a possibility that malware is performing, for example, an unknown operation that does not exist in behavior patterns to be detected in the detection device 150 (i.e. it is difficult for the detection device 150 to detect an operation of the malware).

Therefore, the analysis device 100 identifies, for example, when the number of the behavior to be estimation object of the purpose decreases, a fact that the number of behavior that appear in the history information decreases as information relating to the behavior.

The analysis device 100 may identify, in any format, the fact that the number of behavior that appear in the history information decreases as the information relating to the behavior. The analysis device 100 may represent the knowledge information stored on the knowledge information storage unit 120 by adding particular behavior, for example, as illustrated in FIG. 16. The particular behavior indicates that, for example, a situation is unclear with respect to an operation of malware. Further, the particular behavior may have, for example, a format associated with all functions. In this case, the purpose estimating unit 110 of the analysis device 100 may be configured to always estimate, when estimating a purpose of behavior, a purpose of the particular behavior. By this means, the user of the analysis device 100 may find that there is a possibility that an operation of unknown malware difficult to detect by the detection device 150 exists.

Further, it is conceivable that the history information held on the analysis device 100 may indicate that an appearance frequency of the specific behavior to be estimated for the purpose using the analysis device 100 decreases. In such a case, the analysis device 100 identifies a fact that the appearance frequency of the specific behavior that appears in the history information decreases as the information relating to the behavior.

In this case, the analysis device 100 may represent the knowledge information stored on the knowledge information storage unit 120 as a format, for example, as illustrated in FIG. 17. In other words, the analysis device 100 identifies the knowledge information stored on the knowledge information storage unit 120 by adding the particular behavior in association with behavior of which an appearance number has decreased in the history information as the information relating to the behavior. In this case, the particular behavior indicates that, for example, a situation is unclear for an operation of malware relating to the associated behavior.

Further, the analysis device 100 may provide, for example, information relating to the above-described particular behavior for the detection device 150 in association with behavior of which an appearance number has decreased in the history information. In this case, the detection device 150 may be configured in such a manner that when, for example, behavior of which the appearance frequency has decreased in the history information of the analysis device 100 is detected, the particular behavior is always detected by the detection device 150.

By this means, the user of the analysis device 100 may find that there is a possibility that, for example, a specific operation of malware being detected by the detection device 150 has changed. Further, the user of the analysis device 100 may find that there is a possibility that an attacker has come to use another piece of malware to achieve the same purpose. Further, an analyst of malware may clearly find an operation or the like of malware to be focused on analysis, since the particular behavior added by the analysis device 100 is associated with behavior of which the appearance frequency has decreased in the history information.

Note that as illustrated in FIG. 16 or FIG. 17, when the particular behavior has been added to the knowledge information by the analysis device 100, the analysis device 100 may display the knowledge information added with the particular behavior, for example, on a display device that is not illustrated. By this means, the user of the analysis device 100 readily finds information relating to behavior.

Further, a case in which the particular behavior is added to the knowledge information is not limited to the above-described case. The analysis device 100 may add the particular behavior to the knowledge information in association with the behavior in which the history information satisfies a predetermined condition other than the above-described condition. Further, the analysis device 100 may add the particular behavior to the knowledge information in a meaning different from the above-described meaning.

(Example of a Case where Additional Information is Relation Between Behavior and Malware)

Still another example of additional information used by the analysis device 100 in the present example embodiment will be described. In this example, the analysis device 100 uses, as the additional information, information relating to the relation between the behavior to be an estimation object of the purpose and malware which causes the behavior.

Regarding known malware, an association among known malware, behavior caused by malware, and the purpose intended to be achieved by the malware may be already clear. In this case, the analysis device 100 may identify (which does not mean "estimate") a purpose of behavior using the associated relation. Therefore, in this example, the analysis device 100 tries to identify a purpose of behavior, using information relating to a relation between behavior to be an estimation object of a purpose and malware causing the behavior.

In this case, the knowledge information storage unit 120 of the analysis device 100 holds information indicating an association between the behavior and malware causing the behavior. FIG. 18(A) is an example of information stored on the knowledge information storage unit 120. In the example illustrated in FIG. 18(A), a sample identification name of malware is associated with a relation between behavior relating to the malware and a function thereof or a relation between a function and a purpose. Such information is generated by an analyst, for example, on the basis of a known analysis result.

Further, the purpose estimating unit 110 of the analysis device 100 refers to the above-described information when estimating a purpose corresponding to behavior. When, for example, information indicating association with malware depends on a relation between behavior and a purpose estimated for the behavior, the purpose estimating unit 110 identifies the purpose as a purpose about to be achieved by the behavior.

An example in which the analysis device 100 uses the information relating to the relation between the behavior to be an estimation object of the purpose and malware causing the behavior will be illustrated. As one example, in an example illustrated in FIG. 18(B), a case is assumed in which the purpose estimating unit 110 of the analysis device 100 estimates the purpose of behavior "MACT-2014-0010". According to FIG. 18(B), regarding the behavior "MACT-2014-0010," four purposes are estimated.

On the other hand, according to FIG. 18(A), a relation provided with R30 and R32 as relation identifiers is associated with a sample identification name "W32.Morto.B" of malware. Therefore, the purpose estimating unit 110 identifies that "MACT-2014-0010" is behavior caused by malware having "W32.Morto.B" as a sample identifier and a purpose of this behavior is "Click fraud business."

Note that a sample identification name of malware may be associated with the behavior or the function included in the knowledge information stored on the knowledge information storage unit 120.

Further, the analysis device 100 may output, in any format, a result obtained by estimating a purpose using information relating to the relation between the behavior to be an estimation object of the purpose and malware causing the behavior. The analysis device 100 may make an output, for example, to any output device by changing a display format of the purpose identified on the basis of the above information among purposes estimated for behavior.

(Example of a Case where Additional Information is Information Relating to Analyst)

Still another example of additional information used by the analysis device 100 in the present example embodiment will be described. In this example, the analysis device 100 uses, as additional information, information relating to an analyst involved in the knowledge information including a relation between the behavior and the purpose.

The relation between the behavior and the purpose stored on the knowledge information storage unit 120 as the knowledge information is generated, as one example, by analysts having knowledge and experience relating to activities of malware. In this case, the knowledge information relating to the generated relation between the behavior and the purpose depends on the knowledge and the experience of an analyst. In other words, reliability of the generated knowledge information (e.g. accuracy of the information) may differ depending on an analyst having generated the knowledge information.

Therefore, the analysis device 100 uses information relating to an analyst involved in the knowledge information including the relation between the behavior and the purpose. By this means, the analysis device 100 may estimate a purpose of the behavior on the basis of information having high reliability.

One example of the information relating to an analyst having generated the knowledge information is information in which a rank (class) representing reliability is assigned to each analyst. FIG. 19(A) illustrates a relation between an analyst and a rank relating to the analyst. In FIG. 19(A), a value of the rank indicates an amount of knowledge or experience relating to activities of malware or a level of the reliability of generated information. In other words, in the example of FIG. 19(A), an analyst with an identifier of A22 has the highest reliability.

Further, FIG. 19(B) is a diagram illustrating an association between a relation between behavior and a purpose and an analyst having generated the relation included in the knowledge information stored on the knowledge information storage unit 120. According to FIG. 19(B), for each of relations having relation identifiers R40, R41, and R42, the relation is generated by an analyst having A11 as an identifier. Further, according to FIG. 19(B), for relations having relation identifiers R43 and R44, the relation is generated by an analyst having A22 as an identifier.

The purpose estimating unit 110 of the analysis device 100 estimates the purpose of the behavior using the information illustrated in FIGS. 19(A) and 19(B), in addition to the relation between the behavior and the purpose.

As one example, the purpose estimating unit 110 outputs, together with the purpose estimated for the behavior, information of the relation used for estimating the purpose and the analyst having generated the relation. By this means, the user of the analysis device 100 may determine that of purposes of behavior estimated by the analysis device 100, a possibility of a purpose associated by the analyst having A22 as an identifier is high.

Note that the analysis device 100 may use, by a method other than the above-described method, the information relating to an analyst having generated the knowledge information including the relation between the behavior and the purpose. The purpose estimating unit 110 of the analysis device 100 may estimate the purpose of the behavior using, for example, the knowledge information generated by an analyst having the rank of a value equal to or larger than a predetermined value. Further, the purpose estimating unit 110 may estimate the purpose of the behavior using the knowledge information generated by a specific analyst. Further, the purpose estimating unit 110 may calculate a matching degree, also using the value of a rank for an analyst when calculating the above-described matching degree.

As described above, the analysis device 100 in the present example embodiment estimates the purpose of the behavior, using additional information relating to behavior or a relation between behavior and a purpose. In other words, the analysis device 100 in the present example embodiment may estimate the purpose of the behavior, even using information that is difficult to represent by the behavior or the relation between the behavior and the purpose. Therefore, the analysis device 100 in the present example embodiment may improve accuracy in estimating the purpose.

Note that the analysis device 100 in the present example embodiment may estimate a purpose of behavior, using, as additional information, information different from the above-described information. Further, the analysis device 100 in the present example embodiment may use the above-described pieces of the additional information by a combination thereof.

Further, any configuration for the modified examples of the analysis device 100 in the first example embodiment of the present invention may be used by a combination with each example of the analysis device 100 in the present example embodiment.

Third Example Embodiment

Figure 20:
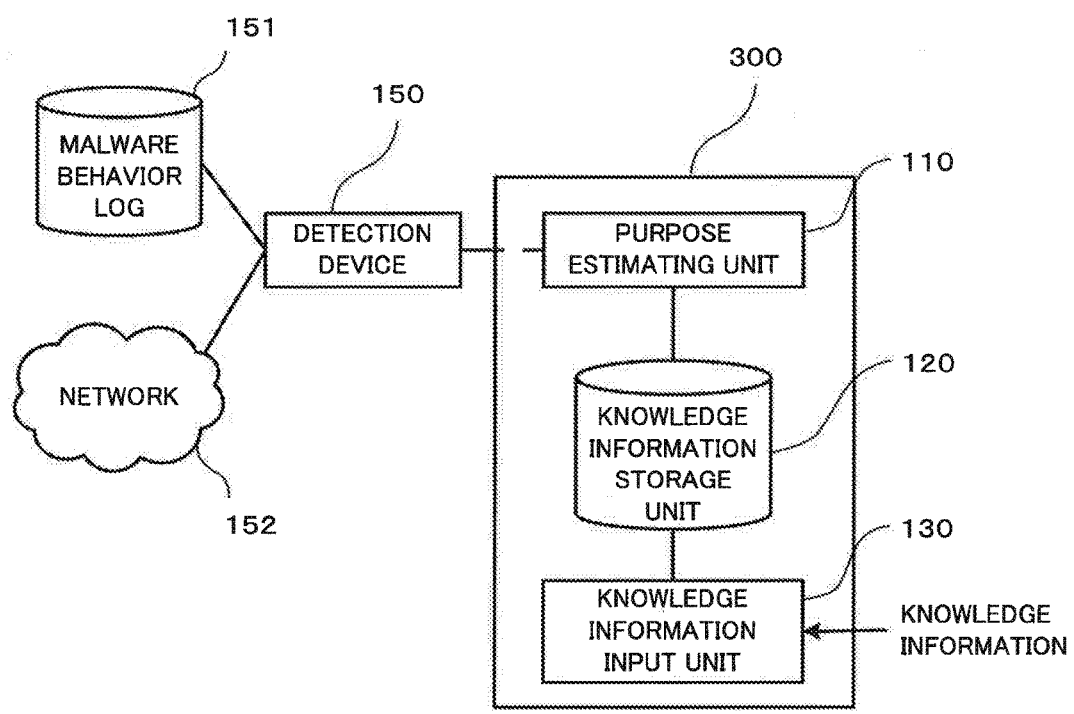
FIG. 20 is a diagram illustrating a configuration of an analysis device 300 in a third example embodiment of the present invention and an analysis system or the like including the analysis device.
Figure 21:
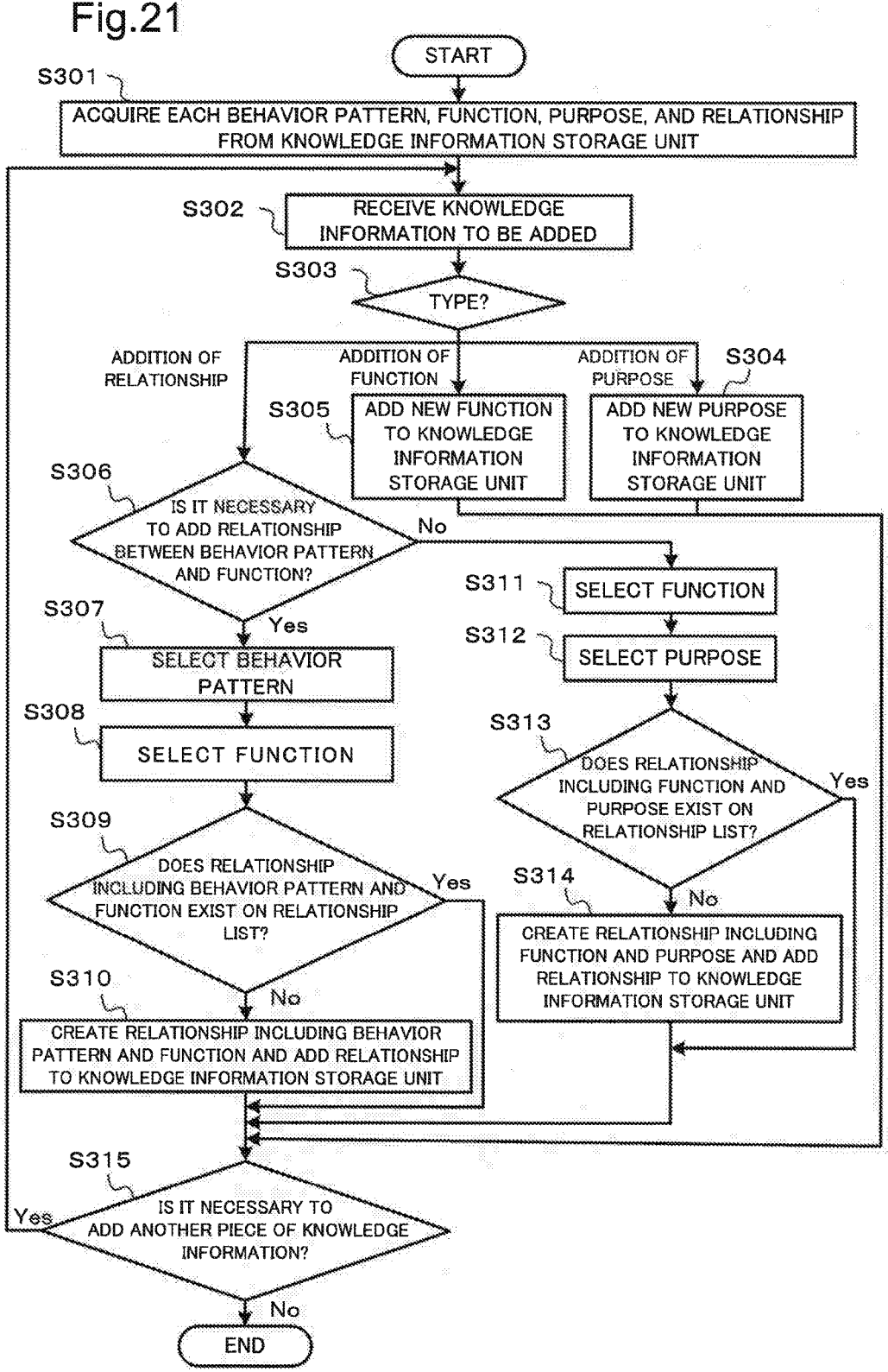
FIG. 21 is a flowchart illustrating steps in which a knowledge information input unit 130 receives knowledge information in the analysis device 300 in the third example embodiment of the present invention.
Figure 22:
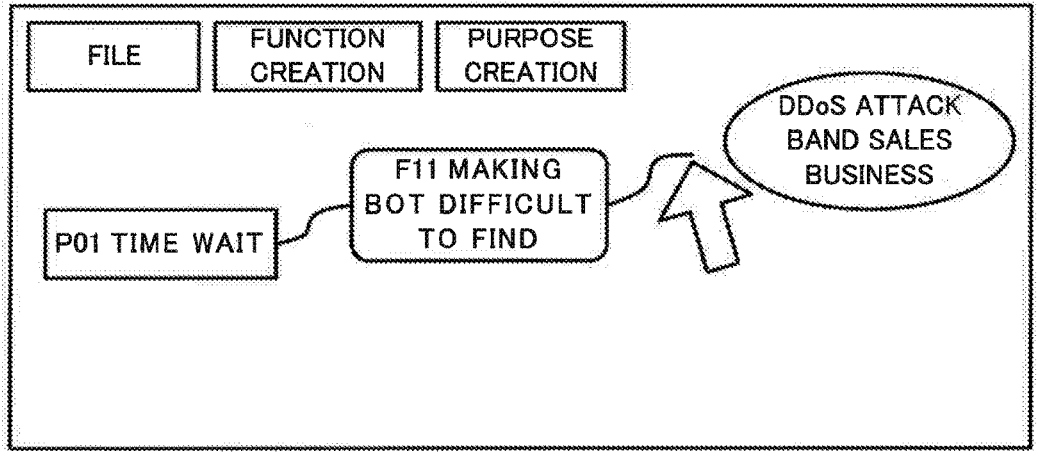
FIG. 22 is one example of an input screen in which the knowledge information input unit 130 receives knowledge information.

Next, a third example embodiment of the present invention will be described. FIG. 20 is a diagram illustrating a configuration of an analysis device 300 in the third example embodiment of the present invention and an analysis system or the like including the analysis device. FIG. 21 is a flowchart illustrating steps in which a knowledge information input unit 130 receives knowledge information in the analysis device 300 in the third example embodiment of the present invention. FIG. 22 is one example of an input screen in which the knowledge information input unit 130 receives knowledge information.

As illustrated in FIG. 20, the analysis device 300 in the third example embodiment of the present invention includes a purpose estimating unit 110, a knowledge information storage unit 120, and a knowledge information input unit 130. The purpose estimating unit 110 and the knowledge information storage unit 120 include the same functions as in the analysis device 100 according to the first example embodiment of the present invention. The knowledge information input unit 130 receives knowledge information including a relation between the behavior and the purpose.

In other words, the analysis device 300 in the present example embodiment is different from the analysis device 100 in the first example embodiment of the present invention in a point that the knowledge information input unit 130 is included. Configurations other than this of the analysis device 300 in the present example embodiment can be the same as in the analysis device 100 in the first example embodiment of the present invention.

In the present example embodiment, the knowledge information input unit 130 receives the knowledge information including at least the relation between the behavior and the purpose. The knowledge information newly received by the knowledge information input unit 130 is added, for example, to the knowledge information storage unit 120. The new knowledge information stored by the knowledge information storage unit 120 is used when the purpose estimating unit 110 estimates the purpose of the behavior.

In this manner, the analysis device 300 in the present example embodiment includes the knowledge information input unit 130, and thereby may estimate the purpose of the behavior, using the knowledge information newly added by the knowledge information input unit 130. Therefore, the analysis device 300 in the present example embodiment readily estimates, when new malware has been detected or malware has been analyzed by an analyst, the purpose by reflecting information relating thereto in the knowledge information.

Note that the knowledge information received by the knowledge information input unit 130 is not limited to the relation between the behavior and the purpose. The knowledge information input unit 130 may receive also the purpose of executing the behavior. Further, the knowledge information input unit 130 may receive a function achieved by the behavior, the relation between the behavior and the function, or the relation between the function and the purpose.

Further, the knowledge information received by the knowledge information input unit 130 need not be stored on the knowledge information storage unit 120. The knowledge information received by the knowledge information input unit 130 may be used when the purpose estimating unit 110 estimates the purpose.

Next, using FIG. 21, an example of steps of receiving the knowledge information by the knowledge information input unit 130 will be described. In the following example, it is assumed that the knowledge information input unit 130 receives the purpose of executing the behavior, the function achieved by the behavior, the relation between the behavior and the function, or the relation between the function and the purpose.

The knowledge information input unit 130 first reads and acquires respective pieces of information of the behavior, the function, the purpose, and the relation that are the knowledge information from the knowledge information storage unit 120. (step S301).

Then, the knowledge information input unit 130 receives the knowledge information to be added from an input unit that is not illustrated (step S302).

The knowledge information input unit 130 confirms a type of the knowledge information to be received and added (step S303). When the information to be received is the purpose, the knowledge information input unit 130 receives the purpose and adds the received purpose to the knowledge information storage unit 120 (step S304). When the knowledge information to be received is the function, the knowledge information input unit 130 receives the function and adds the received function to the knowledge information storage unit 120 (step S305). When the process of step S304 or step S305 is terminated, the knowledge information input unit 130 moves to process of step S315. Further, when the knowledge information to be received is the relation, the knowledge information input unit 130 moves to next step S306.

In step S306, the knowledge information input unit 130 confirms a type of the relation to be received. In the example illustrated in FIG. 21, the knowledge information input unit 130 confirms whether the relation to be added to the knowledge information storage unit 120 is the relation between the behavior and the function. When the relation to be added to the knowledge information storage unit 120 is the relation between the behavior and the function (step S306: Yes), the knowledge information input unit 130 selects the behavior to be an additional object of the relation from the information acquired in step S301 (step S307). The knowledge information input unit 130 selects the function to be an additional object of the relation from the information acquired in step S301 (step S308). The knowledge information input unit 130 confirms whether the relation between the behavior and the function selected in steps S307 and S308, respectively, exists as the knowledge information on the knowledge information storage unit 120 (step S309). When the relation does not exist on the knowledge information storage unit 120 (step S309: No), the knowledge information input unit 130 generates the relation between the behavior and the function and adds the generated relation to the knowledge information storage unit 120 (step S310). When the relation already exists on the knowledge information storage unit 120 (step S309: Yes), the knowledge information input unit 130 does not execute specific process. When the process of steps S309 and S310 is terminated, the knowledge information input unit 130 moves to the process of step S315.

On the other hand, when the relation to be added to the knowledge information storage unit 120 is not the relation between the behavior and the function (step S306: No), the knowledge information input unit 130 determines to add the relation between the function and the purpose. The knowledge information input unit 130 selects the function to be an additional object of the relation from the information acquired in step S301 (step S311). The knowledge information input unit 130 selects the purpose to be an additional object of the relation from the information acquired in step S301 (step S312).

Then, the knowledge information input unit 130 confirms whether the relation between the function and the purpose selected in steps S311 and S312, respectively, exists as the knowledge information on the knowledge information storage unit 120 (step S313). When the relation does not exist on the knowledge information storage unit 120 (step S313: No), the knowledge information input unit 130 generates the relation between the function and the purpose and adds the generated relation to the knowledge information storage unit 120 (step S314). When the relation already exists on the knowledge information storage unit 120 (step S313: Yes), the knowledge information input unit 130 does not specifically execute process. When the process of steps S313 and S314 is terminated, the knowledge information input unit 130 moves to the process of step S315.

Finally, the knowledge information input unit 130 confirms the presence or absence of knowledge information to be additionally added (step S315). When there is information to be added, the knowledge information input unit 130 returns to step S302 and continues the process. When there is no information to be added, the knowledge information input unit 130 terminates the process.

Note that the knowledge information input unit 130 displays an input screen on a display device or the like, not illustrated, and thereby may receive knowledge information. FIG. 22 illustrates an example of the input screen. The knowledge information input unit 130 displays, when receiving the function or purpose, an input screen, for example, as in each of FIG. 22(A) or FIG. 22(B) on a display device or the like. Further, the knowledge information input unit 130 displays, when receiving the relation, an input screen as in FIG. 22(C), for example, on a display device or the like. In this case, the user of the analysis device 300 performs a drag operation, for example, for this input screen using a mouse from the behavior to the function or the function to the purpose and thereby may provide the relation intended to be registered for the knowledge information input unit 130. An arrow in FIG. 22(C) is an example in which by executing a drag operation using a mouse, the relation intended to be registered is provided for the knowledge information input unit 130.

As described above, when including the knowledge information input unit 130, the analysis device 300 in the present example embodiment may receive new knowledge information. Therefore, the analysis device 300 in the present example embodiment may estimate the purpose of behavior using newly received knowledge information. Therefore, the analysis device 300 in the present example embodiment may improve accuracy in estimating the purpose.

Note that any configuration regarding the analysis devices and modified examples thereof in the first and second example embodiments of the present invention may be used by a combination with the analysis device 300 of the present example embodiment.

Fourth Example Embodiment

Figure 23:
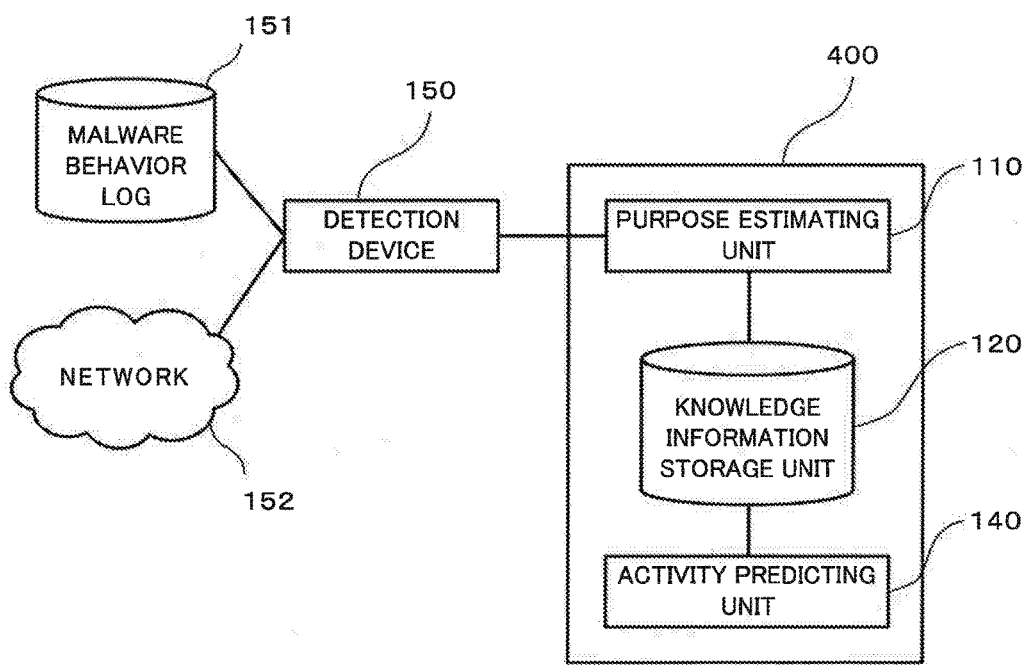
FIG. 23 is a diagram illustrating a configuration of an analysis device 400 in a fourth example embodiment of the present invention and an analysis system or the like including the analysis device.
Figure 24:
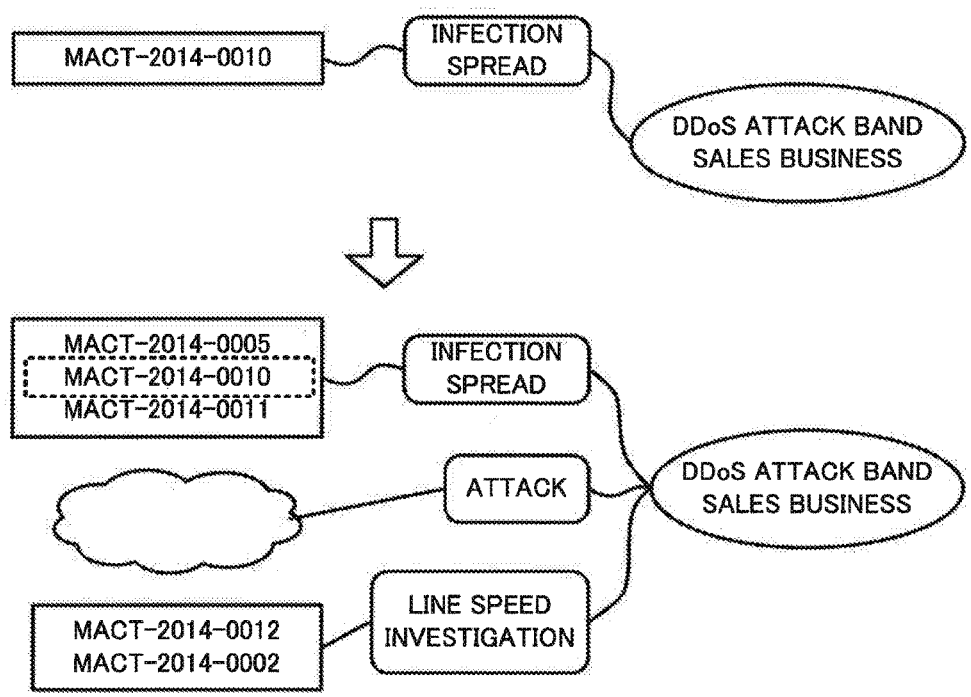
FIG. 24 is a diagram illustrating an example of behavior or function predicted by the analysis device 400 in the fourth example embodiment of the present invention.

Next, a fourth example embodiment of the present invention will be described. FIG. 23 is a diagram illustrating a configuration of an analysis device 400 in the fourth example embodiment of the present invention and an analysis system or the like including the analysis device. FIG. 24 is a diagram illustrating an example of behavior or a function predicted by the analysis device 400 in the fourth example embodiment of the present invention.

As illustrated in FIG. 23, the analysis device 400 in the fourth example embodiment of the present invention includes a purpose estimating unit 110, a knowledge information storage unit 120, and an activity predicting unit 140. The purpose estimating unit 110 and the knowledge information storage unit 120 include the same functions as in the analysis device 100 according to the first example embodiment of the present invention. The activity predicting unit 140 predicts, based on the knowledge information stored on the knowledge information storage unit 120, the behavior or the function that achieves the purpose estimated in the purpose estimating unit 110.

In other words, the analysis device 400 in the present example embodiment is different from the analysis device 100 in the first example embodiment of the present invention in a point that the activity predicting unit 140 is included. Configurations other than this of the analysis device 400 in the present example embodiment may be the same as in the analysis device 100 in the first example embodiment of the present invention.

In the present example embodiment, the activity predicting unit 140 predicts, based on knowledge information stored on the knowledge information storage unit 120, the behavior or the function that achieves the purpose estimated in the purpose estimating unit 110. As one example, the activity predicting unit 140 traces, from the purpose estimated based on the knowledge information, the relation included in the knowledge information toward the behavior or the function in a manner reverse to that in estimation to predict the behavior or the function that achieves the purpose.

FIG. 24 illustrates one example in which the activity predicting unit 140 predicts the behavior or the function. In this case, as illustrated in the upper side of FIG. 24, first, the purpose estimating unit 110 estimates a purpose of "DDoS attack band sales business" from behavior of "MACT-2014-0010" via a function of "Infection spread." The activity predicting unit 140 predicts the behavior or the function that achieves the purpose, as illustrated in the lower side of FIG. 24. The activity predicting unit 140 predicts, for example, that there are further behavior of "MACT-2014-0005" and "MACT-2014-0011" to achieve the function of "Infection spread." Further, the activity predicting unit 140 predicts that there are functions of "Line speed investigation" and "Attack" to achieve the purpose of "sales business of bandwidth for DDoS". Further, the activity predicting unit 140 predicts that there are behavior of "MACT-2014-0012" and "MACT-2014-0002" to achieve the function of "Line speed investigation." Note that when there is no knowledge information relating to the behavior carried out to achieve a predicted function, the activity predicting unit 140 indicates the fact in any format. As one example, in the example of FIG. 24, a fact that there is not the behavior carried out to achieve the function of "Attack" in knowledge information is indicated by an icon of a cloud.

Further, the behavior or the function predicted in the activity predicting unit 140 is output in any format.

When the purpose achieved by a certain piece of malware is also achievable by another piece of malware for different behavior, an attacker may try to achieve the purpose using the another piece of malware. In other words, when the behavior of malware having been detected until then has not been detected, the attacker may generate another piece of malware having different behavior and be executing the malware. The analysis device 400 in the present example embodiment may predict, in such a case, the behavior caused by such another piece of malware, using the knowledge information by the activity predicting unit 140. Therefore, the user of the analysis device 400 may find another behavior to be predicted, together with an estimated purpose. Therefore, the user of the analysis device 400 may take measures, for example, against the predicted behavior or the function.

As described above, the analysis device 400 in the present example embodiment includes the activity predicting unit 140. The analysis device 400 in the present example embodiment predicts, by the activity predicting unit 140, behavior or a function that achieves an estimated purpose. Therefore, the analysis device 400 in the present example embodiment enables a user thereof to predict, from an estimated purpose, an activity of another piece of malware that achieves the purpose. In other words, the user of the analysis device 400 may predict, when, for example, behavior of malware is detected in the detection device or the like, an activity of another piece of malware and take measures.

Note that any configuration regarding the analysis devices and modified examples thereof in the first to third example embodiments of the present invention may be used by a combination with the analysis device 400 of the present example embodiment.

While the present invention has been described with reference to example embodiments thereof, the present invention is not limited to these example embodiments. The constitution and details of the present invention can be subjected to various modifications which can be understood by those skilled in the art within the scope of the present invention. Further, the configurations of the example embodiments can be combined with each other without departing from the scope of the present invention.

REFERENCE SIGNS LIST

10 Analysis system
50 Information processing device
51 CPU
52 ROM
53 RAM
54 Program
55 Storage device
56 Storage medium
57 Drive device
58 Communication interface
59 Network
60 Input/output interface
61 Bus
100, 300, 400 Analysis device
110 Purpose estimating unit
120 Knowledge information storage unit
130 Knowledge information input unit
140 Activity predicting unit
150 Detection device
151 Malware behavior log
152 Network
160 Terminal device

The invention claimed is:

1. An analysis device comprising:
at least one memory; and
at least one processor coupled to the at least one memory, the at least one memory storing:
knowledge information including a list of behaviors of a computer and a list of purposes of an attacker using malware, each purpose in the list of purposes causing the computer to execute a behavior in the list of behaviors; and
analyst information including information of a list of analysts, each analyst in the list of analysts setting a relation between a purpose in the list of purposes and a behavior in the list of behaviors,
wherein the at least one processor is configured to:
identify, using a detected behavior of the computer detected by a behavior detection device, and from the list of purposes, a purpose related to the detected behavior; and
output the identified purpose and information about the analyst, from the list of analysts, who set a relation between the identified purpose and the detected behavior.

2. The analysis device according to claim 1, wherein the knowledge information further includes at least one function achieved by each behavior in the list of behaviors, a second relation between the behavior and the at least one function, or a third relation between the at least one function and a purpose related to the behavior.

3. The analysis device according to claim 1, wherein the at least one processor is configured to identify the purpose related to the detected behavior based on a matching degree between the detected behavior and a behavior previously identified as an operation of malware.

4. The analysis device according to claim 1, wherein the at least one processor is configured to identify a behavior satisfying a predetermined condition based on information relating to a history of the behavior used to estimate the purpose.

5. The analysis device according to claim 4, wherein the at least one processor is configured to add the behavior satisfying the predetermined condition to the knowledge information when the history represents a predetermined situation.

6. The analysis device according to claim 1, wherein the at least one processor is configured to identify the purpose related to the detected behavior based on information indicating a fourth relation between information included in the knowledge information and malware.

7. The analysis device according to claim 1, wherein the at least one processor is configured to
receive input of the knowledge information.

8. The analysis device according to claim 1, wherein the at least one processor is configured to predict a behavior that achieves the purpose based on the identified purpose and the knowledge information.

9. An analysis method comprising:
acquiring knowledge information and analyst information from a storage device, wherein
the knowledge information includes a list of behaviors of a processing device and a list of purposes of an attacker using malware, each purpose in the list of purposes causing the processing device to execute a behavior in the list of behaviors, and
the analyst information includes information of a list of analysts, each analyst in the list of analysts setting a relation between a purpose in the list of purposes and a behavior in the list of behaviors;
identifying, using a detected behavior of the processing device detected by a behavior detection device, and from the list of purposes, a purpose related to the detected behavior; and
outputting the identified purpose and, information about an analyst, from the list of analysts, who set a relation between the identified purpose and the detected behavior.

10. A non-transitory computer-readable recording medium recording a program that causes a computer to execute an analysis method, the computer being coupled to a storage device storing:
knowledge information includes a list of behaviors of a processing device and a list of purposes of an attacker using malware, each purpose in the list of purposes causing the processing device to execute a behavior in the list of behaviors; and analyst information includes information of a list of analysts, each analyst in the list of analysts setting a relation between a purpose in the list of purposes and a behavior in the list of behaviors wherein the analysis method comprises:

identifying, using a detected behavior of the processing device detected by a behavior detection device, and from the list of purposes, a purpose related to the detected behavior; and outputting the identified purpose and, information about an analyst, from the list of analysts, who set a relation between the identified purpose and the detected behavior.

11. The analysis device according to claim 1, wherein the at least one memory stores information about reliability of each analyst in the list of analysts, and the at least one processor is configured to output the identified purpose and information about the reliability of the analyst who set the relation between the identified purpose and the detected behavior.

12. The analysis device according to claim 1, wherein the at least one memory stores information about reliability of each analyst in the list of analysts, and the at least one processor is configured to identify the purpose using the knowledge information generated by an analyst whose value indicating reliability is equal to or larger than a predetermined value.

13. The analysis method according to claim 9, wherein the storage device stores information about reliability of each analyst in the list of analysts, and the analysis method comprises outputting the identified purpose and information about the reliability of the analyst who set the relation between the identified purpose and the detected behavior.

14. The analysis method according to claim 9, wherein the storage device stores information about reliability of each analyst in the list of analysts, and the analysis method comprises identifying the purpose using the knowledge information generated by an analyst whose value indicating reliability is equal to or larger than a predetermined value.

15. The non-transitory computer-readable recording medium according to claim 10, wherein the storage device stores information about reliability of each analyst in the list of analysts, and the analysis method comprises outputting the identified purpose and information about the reliability of the analyst who set the relation between the identified purpose and the detected behavior.

16. The non-transitory computer-readable recording medium according to claim 10, wherein the storage device stores information about reliability of each analyst in the list of analysts, and the analysis method comprises identifying the purpose using the knowledge information generated by an analyst whose value indicating reliability is equal to or larger than a predetermined value.

* * * * *